US010868952B2

(12) United States Patent
Sugita

(10) Patent No.: US 10,868,952 B2
(45) Date of Patent: Dec. 15, 2020

(54) IMAGE-CAPTURING APPARATUS, ACCESSORY APPARATUS AND CONTROL METHOD THEREFOR

(71) Applicant: CANON KABUSHIKI KAISHA, Tokyo (JP)

(72) Inventor: Atsushi Sugita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/383,770

(22) Filed: Apr. 15, 2019

(65) Prior Publication Data

US 2019/0246031 A1 Aug. 8, 2019

Related U.S. Application Data

(62) Division of application No. 15/652,506, filed on Jul. 18, 2017, now Pat. No. 10,306,130.

(30) Foreign Application Priority Data

Jul. 25, 2016 (JP) ................................. 2016-145147

(51) Int. Cl.
*H04N 5/232* (2006.01)
*G03B 17/14* (2006.01)
(Continued)

(52) U.S. Cl.
CPC .......... *H04N 5/23209* (2013.01); *G03B 3/10* (2013.01); *G03B 17/14* (2013.01); *H04N 5/2254* (2013.01);
(Continued)

(58) Field of Classification Search
CPC ............. H04N 5/23209; H04N 5/2254; H04N 5/23245; H04N 5/23258; H04N 5/23287;
(Continued)

(56) References Cited

U.S. PATENT DOCUMENTS 6,400,903 B1   6/2002 Conoval
7,574,126 B2   8/2009 Honjo et al.
(Continued)

FOREIGN PATENT DOCUMENTS

CN   101241220 A   8/2008
CN   102630308 A   8/2012
(Continued)

OTHER PUBLICATIONS

Jan. 2, 2018 Great Britain Search and Examination Report in Great Britain Appln. No. GB1711695.5.
(Continued)

*Primary Examiner* — Lin Ye
*Assistant Examiner* — John H Morehead, III
(74) *Attorney, Agent, or Firm* — Venable LLP

(57) ABSTRACT

The image-capturing apparatus includes a camera communicator configured to provide, with the accessory apparatus, a first data communication channel used for transmitting accessory data from the accessory apparatus to the image-capturing apparatus, and a second data communication channel used for transmitting camera data from the image-capturing apparatus to the accessory apparatus; and a camera controller configured to perform communication with the accessory apparatus through the camera communicator. The camera controller and the accessory apparatus are configured to be capable of switching their communication modes between a first communication mode and a second communication mode. The camera controller is configured to cause the accessory apparatus to transmit the accessory data whose settings of parity bits are different between in the first and second communication modes.

39 Claims, 11 Drawing Sheets

(51) Int. Cl.
*H04N 5/225* (2006.01)
*G03B 3/10* (2006.01)

(52) U.S. Cl.
CPC . *H04N 5/23245* (2013.01); *G03B 2205/0007* (2013.01); *G03B 2206/00* (2013.01); *H04N 5/23258* (2013.01); *H04N 5/23287* (2013.01)

(58) Field of Classification Search
CPC .......... H04N 5/23225; H04N 5/23203; H04N 5/225; G03B 3/10; G03B 17/14; G03B 2206/00; G03B 2205/0007
See application file for complete search history.

(56) References Cited

U.S. PATENT DOCUMENTS

| | | | |
|---|---|---|---|
| 7,801,435 B2 | 9/2010 | Honjo et al. | |
| 7,885,529 B2 | 2/2011 | Honjo et al. | |
| 8,374,499 B2 | 2/2013 | Sakamoto | |
| 8,616,790 B2 | 12/2013 | Osawa | |
| 9,888,175 B2 | 2/2018 | Kawanami | |
| 10,306,130 B2 | 5/2019 | Sugita | |
| 2007/0133970 A1* | 6/2007 | Honjo | G02B 7/08 396/97 |
| 2009/0180770 A1* | 7/2009 | Honjo | G03B 5/00 396/55 |
| 2009/0268310 A1 | 10/2009 | Honjo et al. | |
| 2010/0310245 A1 | 12/2010 | Honjo et al. | |
| 2011/0170853 A1 | 7/2011 | Osawa | |
| 2011/0299847 A1 | 12/2011 | Sakamoto | |
| 2012/0050549 A1 | 3/2012 | Maekawa | |
| 2013/0308042 A1 | 11/2013 | Kawada | |
| 2016/0127644 A1 | 5/2016 | Kawanami | |
| 2017/0289414 A1* | 10/2017 | Komatsu | H04N 5/2254 |
| 2017/0289425 A1* | 10/2017 | Takanashi | H04N 5/23203 |
| 2017/0289430 A1 | 10/2017 | Seki et al. | |

FOREIGN PATENT DOCUMENTS

| | | |
|---|---|---|
| CN | 105578031 A | 5/2016 |
| EP | 3226545 A1 | 10/2017 |
| EP | 3229461 A2 | 10/2017 |
| JP | H11-338029 A | 12/1999 |
| JP | 2005-037824 A | 2/2005 |
| JP | 2011-257544 A | 12/2011 |

OTHER PUBLICATIONS

Dec. 4, 2019 Chinese Official Action in Chinese Patent Appln. No. 201710611583.5.

Feb. 7, 2020 Korean Official Action in Korean Patent Appln. No. 10-2017-0091862.

* cited by examiner

IMAGE-CAPTURING APPARATUS, ACCESSORY APPARATUS AND CONTROL METHOD THEREFOR

This application is a division of application Ser. No. 15/652,506 filed Jul. 18, 2017.

BACKGROUND OF THE INVENTION

Field of the Invention

The present invention relates to an image-capturing apparatus (hereinafter referred to as "a camera body") and an accessory apparatus such as an interchangeable lens, which are communicable with each other.

Description of the Related Art

In an accessory-interchangeable camera system including a camera body to which an accessory apparatus is detachably attachable, the camera body and the accessory apparatus (hereinafter referred to as "an interchangeable lens") communicate with each other for controlling the interchangeable lens from the camera body and for providing, from the interchangeable lens to the camera body, data required for controlling the interchangeable lens. An increase in data amount communicated between the camera body and the interchangeable lens requires an increase in communication speed.

Japanese Patent Laid-Open No. 2005-037824 discloses a camera system capable of switching its communication mode between a normal communication mode and a burst communication mode, in order to increase a communication speed between its camera body and interchangeable lens and to cope with an increased communication data amount. In the burst communication mode, the interchangeable lens stores multiple data to multiple registers once, and then transmits the multiple data in a lump to the camera body. This makes it possible to perform a fast data communication (burst communication) that does not require a communication standby process (BUSY process).

On the other hand, a fast communication speed is likely to cause communication errors due to a noise generated in a communication path. Japanese Patent Laid-Open No. 11-338029 discloses a process that, when a communication error occurs in serial communication between a camera body and an interchangeable lens, detects the communication error and initializes the communication.

However, in the camera system disclosed in Japanese Patent Laid-Open No. 2005-037824, the noise generated in the communication path causes the interchangeable lens to falsely recognize that the camera body requests switching to the burst communication mode and to erroneously perform the burst communication. On the other hand, even though the camera body really requests switching to the burst communication mode, the interchangeable lens may fail to perform the burst communication. Such a difference in communication mode cannot be detected, even though the process disclosed in Japanese Patent Laid-Open No. 11-338029 is performed, until the camera body communicates with the interchangeable lens to confirm the communication mode thereof.

SUMMARY OF THE INVENTION

The present invention provides an image-capturing apparatus and an accessory apparatus capable of quickly detecting a difference in communication mode therebetween.

The present invention provides as an aspect thereof an image-capturing apparatus to which an accessory apparatus is detachably attachable. The image-capturing apparatus includes a camera communicator configured to provide, with the accessory apparatus, a first data communication channel used for transmitting accessory data from the accessory apparatus to the image-capturing apparatus, and a second data communication channel used for transmitting camera data from the image-capturing apparatus to the accessory apparatus; and a camera controller configured to perform communication with the accessory apparatus through the camera communicator. The camera controller and the accessory apparatus are configured to be capable of switching their communication modes between a first communication mode and a second communication mode. The camera controller is configured to cause the accessory apparatus to transmit the accessory data whose settings of parity bits are different between in the first and second communication modes.

The present invention provides as another aspect thereof an accessory apparatus detachably attachable to an image-capturing apparatus. The accessory apparatus includes an accessory communicator configured to provide, with the image-capturing apparatus, a first data communication channel used for transmitting accessory data from the accessory apparatus to the image-capturing apparatus, and a second data communication channel used for transmitting camera data from the image-capturing apparatus to the accessory apparatus; and an accessory controller configured to perform communication with the image-capturing apparatus through the accessory communicator. The accessory controller and the image-capturing apparatus are configured to be capable of switching their communication modes between a first communication mode and a second communication mode. The accessory controller is configured to transmit, to the image-capturing apparatus, the accessory data whose settings of parity bits are different between in the first and second communication modes.

The present invention provides as yet another aspect thereof an image-capturing system including the above image-capturing apparatus and accessory apparatus.

The present invention provides as still another aspect thereof a control method of controlling an image-capturing apparatus to which an accessory apparatus is detachably attachable, the image-capturing apparatus providing, with the accessory apparatus, a first data communication channel used for transmitting accessory data from the accessory apparatus to the image-capturing apparatus, and a second data communication channel used for transmitting camera data from the image-capturing apparatus to the accessory apparatus. The control method includes the step of making the image-capturing apparatus and the accessory apparatus capable of switching their communication modes between a first communication mode and a second communication mode; and the step of controlling the image-capturing apparatus such that the image-capturing apparatus causes the accessory apparatus to transmit the accessory data whose settings of parity bits are different between in the first and second communication modes.

The present invention provides as yet still another aspect thereof a control method of controlling an accessory apparatus detachably attachable to an image-capturing apparatus, the accessory apparatus providing, with the image-capturing apparatus, a first data communication channel used for transmitting accessory data from the accessory apparatus to the image-capturing apparatus, and a second data communication channel used for transmitting camera data from the image-capturing apparatus to the accessory apparatus. The control method includes the step of making the accessory apparatus and the image-capturing apparatus capable of switching their communication modes between a first communication mode and a second communication mode; and the step of controlling the accessory apparatus such that the accessory apparatus transmits, to the image-capturing apparatus, the accessory data whose settings of parity bits are different between in the first and second communication modes.

The present invention provides as further another aspect thereof a non-transitory storage medium storing a computer program for causing a computer to execute the above control method in the above image-capturing apparatus and accessory apparatus.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Embodiment 1

Figure 1:
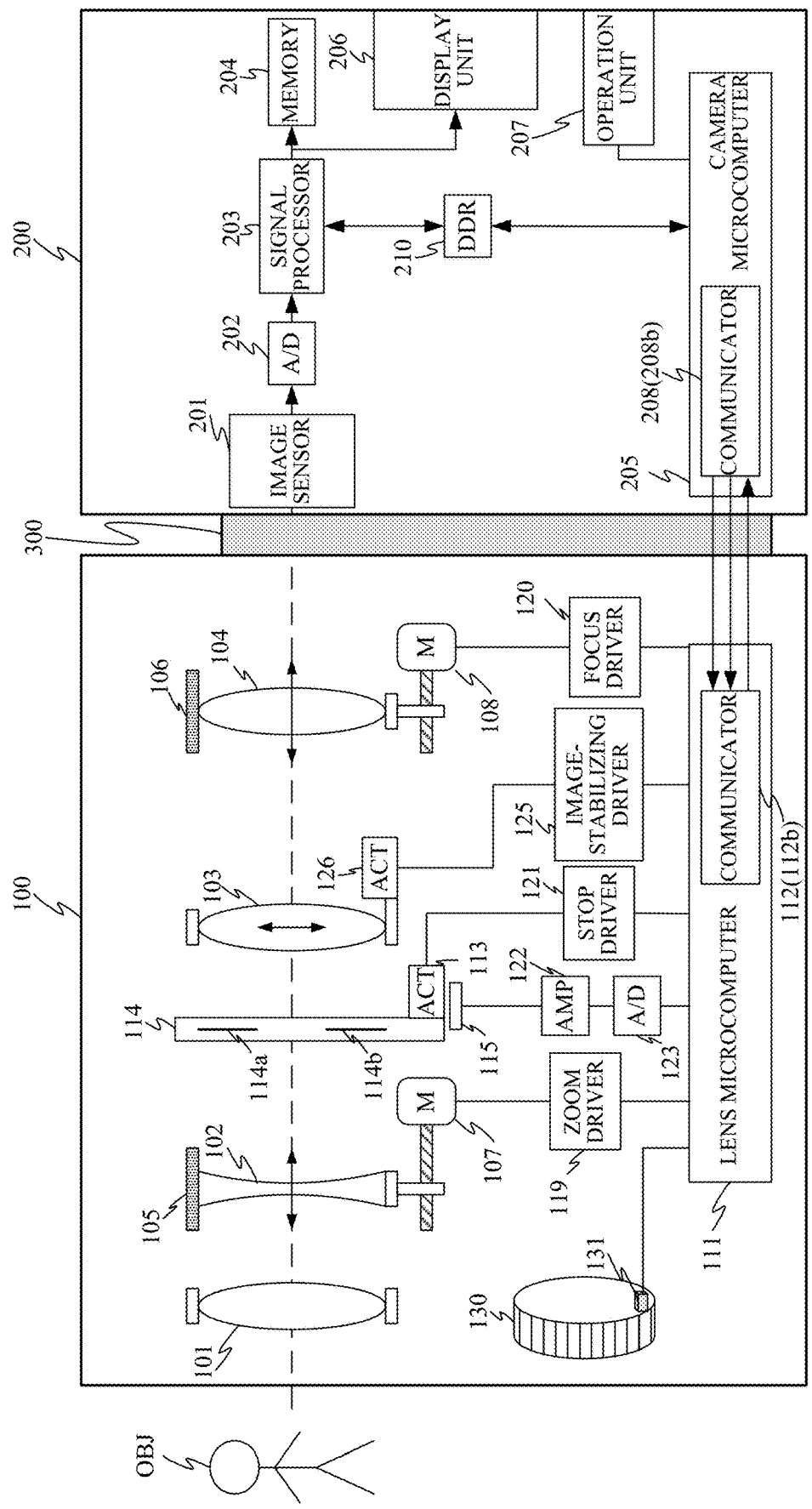
FIG. 1 is a block diagram illustrating a configuration of a camera body and an interchangeable lens in Embodiment 1 of the present invention.

FIG. 1 illustrates a configuration of an image-capturing system (hereinafter referred to as "a camera system") including a camera body 200 as an image-capturing apparatus and an interchangeable lens 100 as an accessory apparatus that are a first embodiment (Embodiment 1) of the present invention.

The camera body 200 and the interchangeable lens 100 transmit control commands and internal information to each other via their communicators described later. The communicators are compatible with various communication methods and switch their communication formats to the same one in synchronization with each other depending on types of data to be communicated and purposes of their communication, which enables selecting an optimum communication format for each of various situations.

First, description will be made of specific configurations of the interchangeable lens 100 and the camera body 200. The interchangeable lens 100 and the camera body 200 are mechanically and electrically connected with each other via a mount 300 including a coupling mechanism. The interchangeable lens 100 receives power supply from the camera body 200 via a power source terminal (not illustrated) provided in the mount 300 and supplies, to various actuators and a lens microcomputer 111 described later, power sources necessary for their operations. The interchangeable lens 100 and the camera body 200 communicate with each other via communication terminals (illustrated in FIG. 2) provided in the mount 300.

The interchangeable lens 100 includes an image-capturing optical system. The image-capturing optical system includes, from an object (OBJ) side, a field lens 101, a magnification-varying lens 102 for variation of magnification, an aperture stop unit 114 for light amount control, an image-stabilizing lens 103 for image blur correction and a focus lens 104 for focusing.

The magnification-varying lens 102 and the focus lens 104 are respectively held by lens holders 105 and 106. The lens holders 105 and 106 are guided by guide bars (not illustrated) movably in an optical axis direction in which an optical axis (illustrated by a broken line) of the image-capturing optical system extends and are driven in the optical axis direction respectively by stepping motors 107 and 108. The stepping motors 107 and 108 rotate in synchronization with drive pulses and respectively move the magnification-varying lens 102 and the focus lens 104.

The image-stabilizing lens 103 is moved in a direction orthogonal to the optical axis of the image-capturing optical system to reduce image blur caused by user's hand jiggling or the like.

The lens microcomputer 111 as an accessory controller controls various operations in the interchangeable lens 100. The lens microcomputer 111 receives, via the lens communicator 112 as an accessory communicator, control commands transmitted from the camera body 200 and transmission requests for lens data (accessory data) output therefrom. The lens microcomputer 111 performs various lens controls corresponding to the control commands and transmits lens data corresponding to the transmission requests to the camera body 200 via the lens communicator 112. The lens microcomputer 111 performs operations relating to the communication with the camera body 200 (that is, with a camera microcomputer 205 described later) according to a lens communication control program as a computer program.

This embodiment employs asynchronous serial communication as a communication method between the lens microcomputer 111 and the camera microcomputer 205. In addition, the lens microcomputer 111 outputs, in response to a zoom command and a focus drive command among the control commands, a zoom drive signal and a focus drive signal to a zoom driver 119 and a focus driver 120 to cause them to drive the stepping motors 107 and 108, thereby performing a zoom process to control a magnification variation operation by the magnification-varying lens 102 and an AF (autofocus) process to control a focus operation by the focus lens 104.

The interchangeable lens 100 is provided with a manual focus ring 130 that is rotationally operable by a user and a focus encoder 131 for detecting a rotational operation amount of the manual focus ring 130. The lens microcomputer 111 causes the focus driver 120 to drive the stepping motor 108 by a drive amount corresponding to the rotational operation amount of the manual focus ring 130 detected by the focus encoder 131 to drive the focus lens 104, thereby performing MF (manual focus).

The aperture stop unit 114 includes stop blades 114a and 114b. An open-and-close state of the stop blades 114a and 114b is detected by a Hall element 115, and a detection result thereof is input to the lens microcomputer 111 through an amplifier 122 and an A/D converter 123.

The lens microcomputer 111 outputs, depending on the input detection result from the A/D converter 123, a stop drive signal to a stop driver 121 so as to cause the stop driver 121 to drive a stop actuator 113, thereby controlling a light amount control operation of the aperture stop unit 114.

The interchangeable lens 100 further includes a shake sensor (not illustrated and hereinafter referred to as "a gyro sensor") constituted by a vibration gyro or the like. The lens microcomputer 111 drives an image-stabilizing actuator 126 constituted by a voice coil motor or the like through an image-stabilizing driver 125 depending on a shake (angular velocity) detected by the gyro sensor, thereby performing an image-stabilizing process to control the movement of the image-stabilizing lens 103. Prior to the driving of the image-stabilizing actuator 126, a lock mechanism that holds the image-stabilizing lens 103 at its initial position is released.

The camera body 200 includes an image sensor 201 constituted by a CCD sensor, a CMOS sensor or the like, an A/D converter 202, a signal processor 203, a recorder (memory) 204, the camera microcomputer 205 and a display unit 206.

The image sensor 201 photoelectrically converts an object image formed by the image-capturing optical system in the interchangeable lens 100 to output an image-capturing signal as an analog electrical signal.

The A/D converter 202 converts the analog image-capturing signal from the image sensor 201 into a digital image-capturing signal. The signal processor 203 performs various image processes on the digital image-capturing signal from the A/D converter 202 to produce a video signal. The signal processor 203 produces, from the video signal, focus information indicating a contrast state of the object image (that is, a focus state of the image-capturing optical system) and luminance information indicating an exposure state. The signal processor 203 outputs the video signal to the display unit 206. The display unit 206 displays the video signal as a live-view image used for checking an image-capturing composition and the focus state. In addition, the signal processor 203 outputs the video signal to the recorder 204. The recorder 204 records the video signal.

A memory 210 is constituted by, for example, a DDR (Double Data Rate SDRAM). The memory 210 stores the digital image-capturing signal obtained using the image sensor 201 and the video signal produced by the image processor 203 and stores the lens data received from the lens microcomputer 111.

The camera microcomputer 205 as a camera controller controls the camera body 200 in response to inputs from a camera operation unit 207 including an image-capturing instructing switch and various setting switches (not illustrated). The camera microcomputer 205 transmits, in response to a user's operation of a zoom switch (not illustrated), the control command relating to the magnification-varying operation of the magnification-varying lens 102 to the lens microcomputer 111 through a camera data transceiver 208b.

Moreover, the camera microcomputer 205 transmits, to the lens microcomputer 111 through the camera data transceiver 208b, the control command relating to the light amount control operation of the aperture stop unit 114 depending on the luminance information and the control command relating to the focusing operation of the focus lens 104 depending on the focus information. The camera microcomputer 205 performs operations relating to the communication with the lens microcomputer 111 according to a camera communication control program as a computer program.

Figure 2:
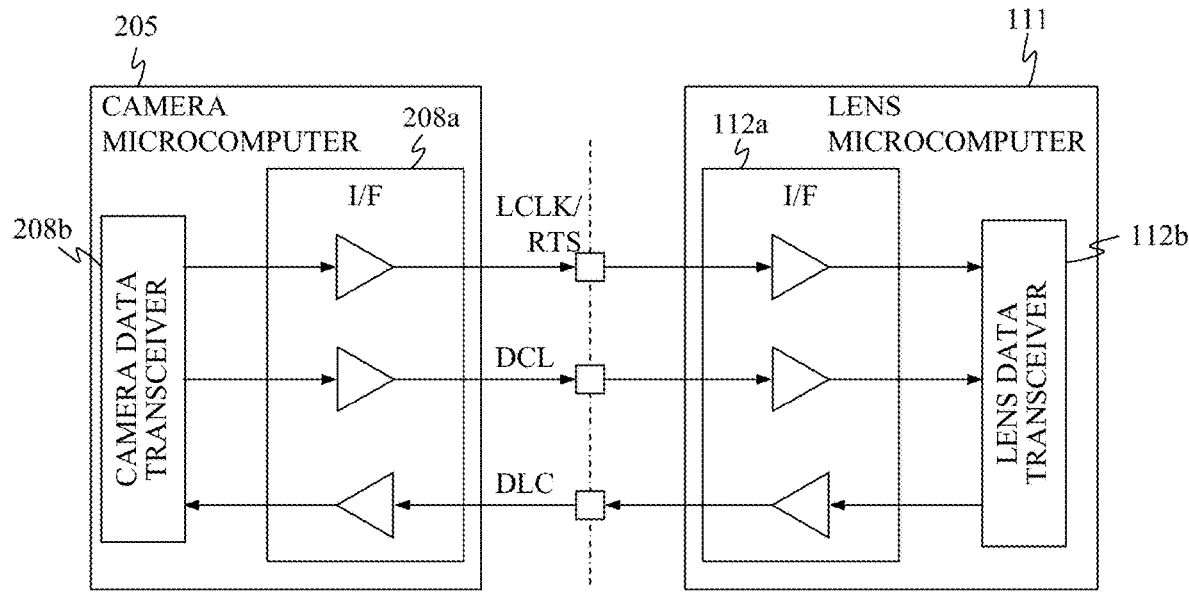
FIG. 2 is a block diagram illustrating a configuration of a communication circuit in Embodiment 1.

Next, with reference to FIG. 2, description will be made of a communication circuit constituted between the camera body 200 (camera microcomputer 205) and the interchangeable lens 100 (lens microcomputer 111) and of the communication performed therebetween. The camera microcomputer 205 has a function of managing settings for the communication with the lens microcomputer 111 and a function of providing notices such as the transmission requests. On the other hand, the lens microcomputer 111 has a function of producing lens data and a function of transmitting the lens data.

The camera microcomputer 205 includes a camera communication interface circuit 208a, and the lens microcomputer 111 includes a lens communication interface circuit 112a. The camera microcomputer 205 (camera data transceiver 208b) and the lens microcomputer 111 (lens data transceiver 112b) communicate with each other through the communication terminals (illustrated by three boxes) provided in the mount 300 and the camera and lens communication interface circuits 208a and 112a. In this embodiment, the camera and lens microcomputers 205 and 111 perform three-wire asynchronous serial communication using three channels. The camera data transceiver 208b and the camera communication interface circuit 208a constitute the camera communicator 208. The lens data transceiver 112b and the lens communication interface circuit 112a constitute the lens communicator 112.

Although a three-wire asynchronous serial communication using three communication channels is used in this embodiment, other number-wire serial communication and communication channels are possible.

The three channels are a transmission request channel as a communication request channel, a first data communication channel and a second data communication channel. The transmission request channel is used for providing the notices such as the transmission requests (transmission instructions) for the lens data and switch requests (switch instructions) for communication settings described later, from the camera microcomputer 205 to the lens microcomputer 111. The provision of the transmission request is performed by switching a signal level (voltage level) on the transmission request channel between High as a first level and Low as a second level. A transmission request signal provided to the transmission request channel is hereinafter referred to as "a request-to-send signal RTS".

The first data communication channel is used for transmitting the lens data from the lens microcomputer 111 to the camera microcomputer 205. The lens data transmitted as a signal from the lens microcomputer 111 to the camera microcomputer 205 through the first data communication channel is hereinafter referred to as "a lens data signal DLC". The second data communication channel is used for transmitting camera data from the camera microcomputer 205 to the lens microcomputer 111. The camera data transmitted as a signal from the camera microcomputer 205 to the lens microcomputer 111 through the second data communication channel is hereinafter referred to as "a camera data signal DCL".

The request-to-send signal RTS is provided from the camera microcomputer 205 as a communication master to the lens microcomputer 111 as a communication slave.

The camera data signal DCL includes various control commands and transmission request commands transmitted from the camera microcomputer 205 to the lens microcomputer 111. The lens data signal DLC includes various lens data transmitted from the lens microcomputer 111 to the camera microcomputer 205.

The camera and lens microcomputers 205 and 111 set their communication speed beforehand and perform the communication (transmission and receipt) at a communication bit rate according to this setting. The communication bit rate indicates a data amount transferable per second and is expressed with a unit of bps (bits per second). The camera and lens microcomputers 205 and 111 communicate with each other by a full-duplex communication method enabling mutual transmission and receipt of data.

Figure 3:
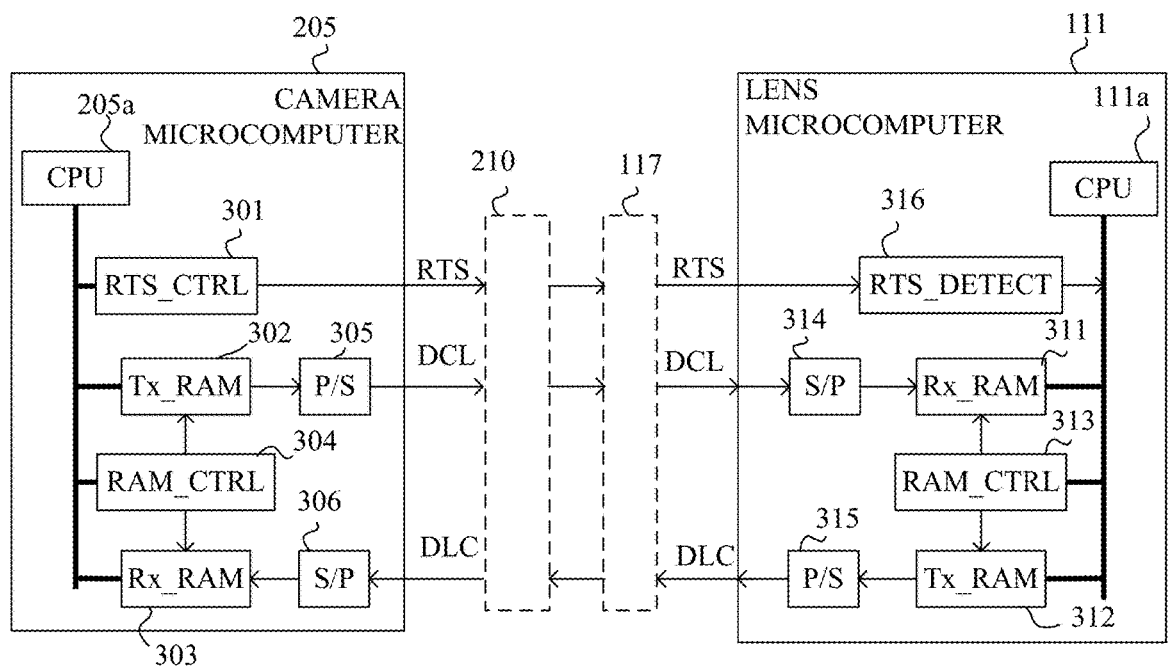
FIG. 3 is a block diagram illustrating a configuration of a lens data transceiver in Embodiment 1.

FIG. 3 illustrates a configuration of the camera data transceiver 208b in the camera microcomputer 205 and the lens data transceiver 112b in the lens microcomputer 111. The camera microcomputer 205 includes a CPU 205a as a core of the camera microcomputer 205, an RTS controller 301 and a transmission data buffer 302 as a camera data buffer constituted by a RAM or the like. The camera microcomputer 205 further includes a receipt data buffer 303 constituted by a RAM or the like and a buffer controller 304 that controls data storing and data read-out to and from the buffers 302 and 303.

On the other hand, the lens microcomputer 111 includes a CPU 111a as a core of the lens microcomputer 111, an RTS detector 316 and a receipt data buffer 311 constituted by a RAM or the like. The lens microcomputer 111 further includes a transmission data buffer 312 as an accessory data buffer constituted by a RAM or the like and a buffer controller 313 that controls data storing and data read-out to and from the buffers 311 and 312.

The camera data signal DCL to be transmitted from the camera microcomputer 205 to the lens microcomputer 111 is stored to the transmission data buffer 302. For example, when the camera data signal DCL of 128 bytes is transmitted, this camera data signal DCL of 128 bytes is first stored to the transmission data buffer 302 and then is transmitted to the lens microcomputer 111. The buffer controller 304 reads out the camera data signal DCL byte by byte (frame by frame) from the transmission data buffer 302. The read camera data signal DCL of each byte is converted from a parallel data signal into a serial data signal by the parallel-serial converter 305 and is transmitted from the camera microcomputer 205 to the lens microcomputer 111 through the second data communication channel.

The camera data signal DCL transmitted from the camera microcomputer 205 is converted from the serial data signal into a parallel data signal by the serial-parallel converter 314 in the lens microcomputer 111.

The buffer controller 313 stores the camera data signal DCL converted into the parallel data signal to the receipt data buffer 311.

The lens data signal DLC to be transmitted from the lens microcomputer 111 to the camera microcomputer 205 is stored to the transmission data buffer 312. For example, when the lens data signal DLC of 128 bytes is transmitted, this lens data signal DLC of 128 bytes is first stored to the transmission data buffer 312 and then is transmitted to the camera microcomputer 205. The buffer controller 313 reads out the lens data signal DLC byte by byte (frame by frame) from the transmission data buffer 312. The read lens data signal DLC of each byte is converted from a parallel data signal into a serial data signal by the parallel-serial converter 315 and is transmitted from the lens microcomputer 111 to the camera microcomputer 205 through the first data communication channel.

The lens data signal DLC transmitted from the lens microcomputer 111 is converted from the serial data signal into a parallel data signal by the serial-parallel converter 306 in the camera microcomputer 205. The buffer controller 304 stores the lens data signal DLC converted into the parallel data signal to the receipt data buffer 303. The lens data signal DLC stored in the receipt data buffer 303 is read out therefrom by the camera CPU 205a, and the read lens data signal DLC is transferred and stored to the memory 210.

In response to transmission of commands for requesting operations from the camera microcomputer 205 to the lens microcomputer 111 through the above communication process, the lens microcomputer 111 controls the actuators (107, 108, 113 and others) corresponding to the operation request commands.

Operation results obtained by the control of the actuators are transmitted from the lens microcomputer 111 to the camera microcomputer 205 without delay (in real time).

Although this embodiment is describing a case of performing three-wire asynchronous serial communication using the transmission request channel (RTS), the first data communication channel (DLC) and the second data communication channel (DCL), three-channel clock-synchronous serial communication may be performed.

This case needs to provide, as channels used for the communication between the camera body and the interchangeable lens, a clock channel for clock signals, a data communication channel for communicating the lens and camera data signals, and a transmission request channel different from these clock and data communication channels.

Figure 4A:
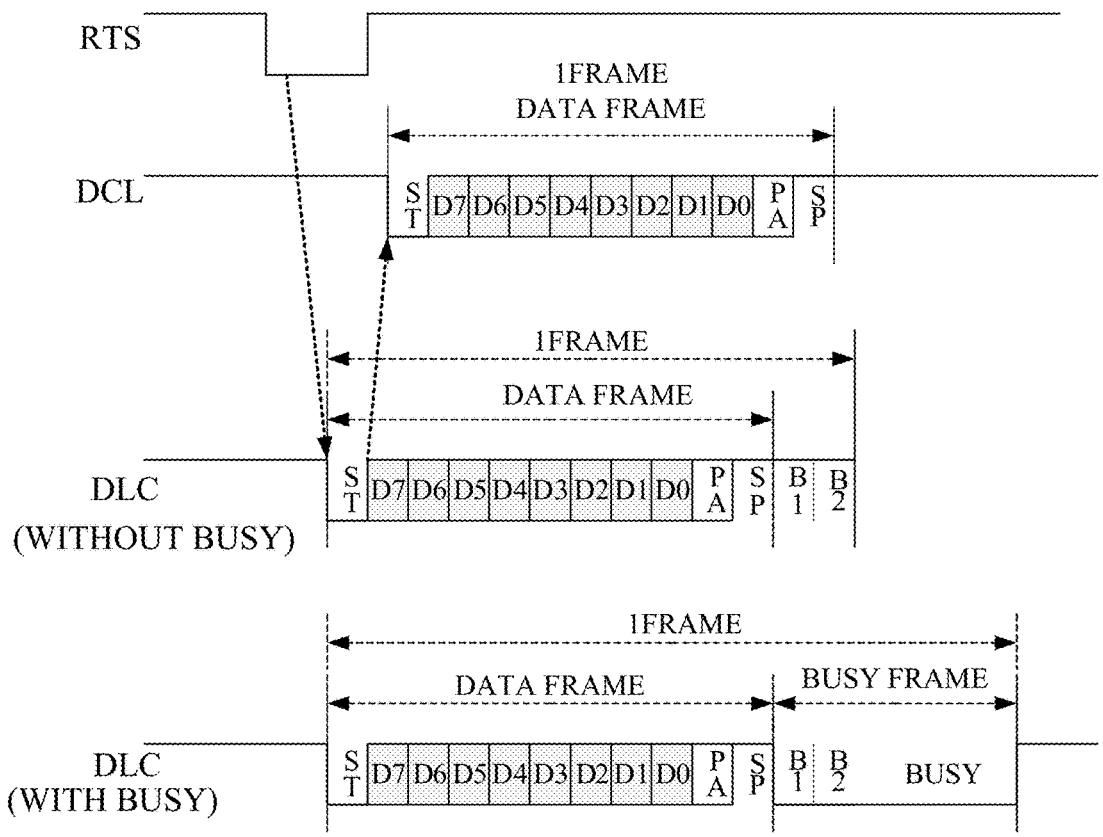
FIGS. 4A to 4C illustrate waveforms of signals communicated between the camera body and the interchangeable lens in Embodiment 1.
Figure 4B:
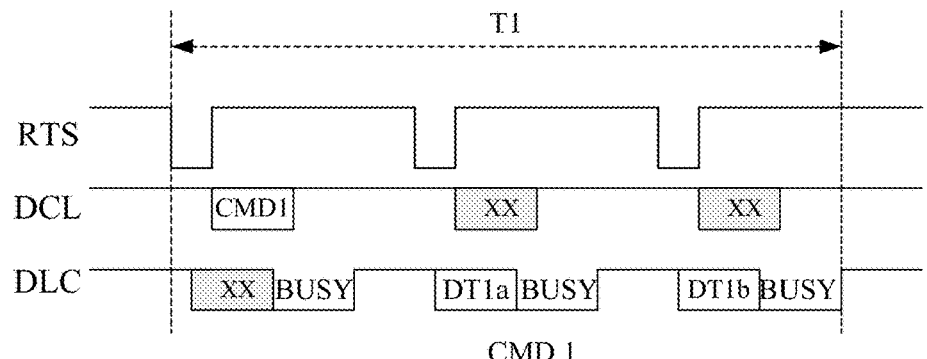
Figure 4C:
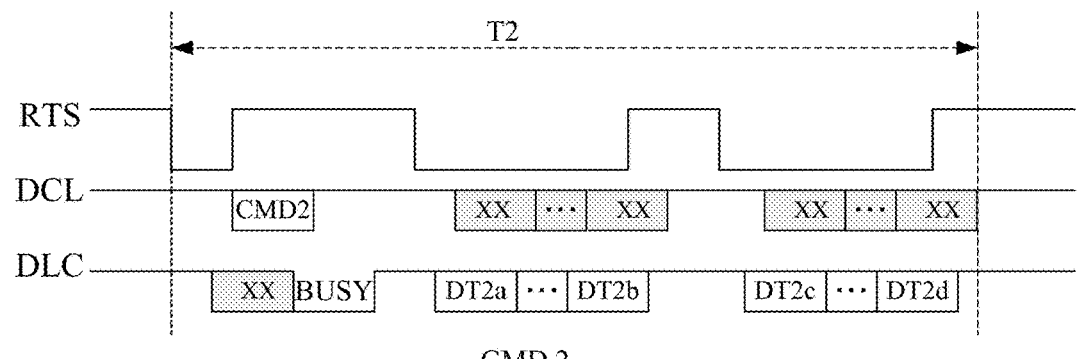

FIGS. 4A to 4C illustrates waveforms of signals transmitted and received between the camera and lens microcomputers 205 and 111 in the first communication setting. An arrangement of procedures of the signal transmission and receipt is called a communication protocol. This embodiment provides a first communication mode (hereinafter referred to as "a BUSY addition mode") in which a BUSY frame is added, and a second communication mode (hereinafter referred to as "a non-BUSY addition mode") in which the BUSY frame is not added.

The camera microcomputer 205 and the lens microcomputer 111 are capable of switching its communication mode between the BUSY addition mode and the non-BUSY addition mode.

FIG. 4A illustrates signal waveforms of one frame as a minimum communication unit. The camera data signal DCL and the lens data signal DLC have mutually different parts in their data formats in the one frame.

First, description will be made of the data format of the lens data signal DLC. The lens data signal DLC in the one frame includes, as large parts, a data frame as a first frame and a BUSY frame as a subsequent frame.

A signal level of the lens data signal DLC is held at High in a non-transmission state where data transmission is not performed.

The lens microcomputer 111 sets the signal level to Low in one bit time period in order to provide a notice of a start of one frame transmission of the lens data signal DLC to the camera microcomputer 205.

The one bit time period indicating a start of one frame is called "a start bit ST" in this embodiment. That is, one data frame is started from this start bit ST. The start bit ST is provided as a head bit of each one frame of the lens data signal DLC.

Next, the lens microcomputer 111 transmits one-byte lens data in 8 bit time period from a subsequent second bit to a ninth bit. The data bits are arranged in an MSB-first format starting from a highest-order data bit D7 and continuing to data bits D6, D5, D4, D3, D2 and D1 in this order and ending with a lowest-order data bit D0.

Then, the lens microcomputer 111 adds one bit parity information (parity bit) PA at a tenth bit and sets the signal level of the lens data signal DLC to High in a time period of a stop bit SP indicating an end of the one frame. Thus, the data frame starting from the start bit SP ends.

Thereafter, as illustrated by "DLC (WITH BUSY)" in FIG. 4A, the lens microcomputer 111 adds the BUSY frame after the stop bit SP. The BUSY frame indicates a time period of a communication standby request BUSY as a notice (hereinafter referred to as "a BUSY notice") from the lens microcomputer 111 to the camera microcomputer 205. The lens microcomputer 111 holds the signal level of the lens data signal DLC to Low until terminating the BUSY notice. The camera microcomputer 205 is prohibited from setting the signal level of the request-to-send signal RTS to Low until the BUSY notice is terminated.

On the other hand, for a case where the BUSY notice is unnecessary to be provided from the lens microcomputer 111 to the camera microcomputer 205, as illustrated by "DLC (WITHOUT BUSY)" in FIG. 4A, a data format is provided that forms one frame without adding the BUSY notice (BUSY frame). That is, the lens microcomputer 111 can select as the data format of the lens data signal DLC, depending on a process situation, one to which the BUSY notice is added and one to which the BUSY notice is not added.

Description will be made of a method of determining the presence and absence of the BUSY notice; the method is performed by the camera microcomputer 205.

In FIG. 4A, the signal waveform of "DLC (WITHOUT BUSY)" and the signal waveform of "DLC (WITH BUSY)" both include bit positions B1 and B2. The camera microcomputer 205 selects one of these bit positions B1 and B2 as a BUSY determination position P for determining the presence and absence of the BUSY notice. As just described, this embodiment employs a data format that selects the BUSY determination position P from the bit positions B1 and B2. This data format enables addressing a problem that a process time from the transmission of the data frame of the lens data signal DLC until the determination of the presence of the BUSY notice (the lens data signal DLC is set to Low) is changed depending on a processing performance of the lens microcomputer 111.

Whether to select the bit position B1 or B2 as the BUSY determination position P is set by the communication between the camera and lens microcomputers 205 and 111 before the data communication therebetween is performed. The BUSY determination position P is not necessary to be fixed at the bit position B1 or B2 and may be changed depending on processing capabilities of the camera and lens microcomputers 205 and 111.

FIG. 4B illustrates signal waveforms in a case of performing continuous communication in the BUSY addition mode illustrated by "DLC (with BUSY)" in FIG. 4A. The BUSY notice (BUSY frame) from the lens microcomputer 111 is provided using the lens data signal DLC through the first data communication channel, and a subsequent communication is started after the BUSY notice is terminated. In FIG. 4B, CMD1 represents a transmission request command that is transmitted as the camera data signal DCL from the camera microcomputer 205 to the lens microcomputer 111. The lens microcomputer 111 transmits, in response to receiving this transmission request command CMD1, lens data signals DT1 (DT1a and DT1b) of two bytes corresponding to the transmission request command CMD1 to the camera microcomputer 205.

FIG. 4C illustrates signal waveforms in a case of performing communication with switching the communication setting (communication mode) between the BUSY addition mode and the non-BUSY addition mode. In an example of FIG. 4C, the communication is first performed in the BUSY addition mode and then performed in the non-BUSY addition mode. In FIG. 4C, CMD2 represents a control command and a transmission request command that are transmitted as the camera data signal DCL from the camera microcomputer 205 to the lens microcomputer 111. The control command is transmitted to the lens microcomputer 111 for controlling switching from the BUSY addition mode to the non-BUSY addition mode.

The transmission request command is transmitted to the lens microcomputer 111 for requesting transmitting lens data signals DT2 (DT2a to DT2d) of a predetermined data amount (bytes). Although FIG. 4C illustrates a case where the camera microcomputer 205 transmits the control and transmission request commands in one frame, the control and transmission request commands may be transmitted in mutually separate frames.

The lens microcomputer 111 switches, in response to receiving the control command in the command CMD2, the communication mode from the BUSY addition mode to the non-BUSY addition mode. Then, the lens microcomputer 111 transmits, in response to receiving the transmission request command in the command CMD2, the lens data signals DT2 (DT2a to DT2d) of the predetermined bytes to the camera microcomputer 205. In the lens data signal transmission, while the camera microcomputer 205 keeps the signal level of the request-to-send signal RTS low, the lens microcomputer 111 continuously transmits the lens data signals DT2 to the camera microcomputer 205.

Furthermore, the camera microcomputer 205 can temporarily interrupt the transmission of the lens data signals DT2 by returning the signal level of the request-to-send signal RTS to High as illustrated in FIG. 4C. Moreover, the camera microcomputer 205 can forcibly terminate the transmission of the lens data signals DT2 by keeping the signal level of the request-to-send signal RTS High. In response to completion of the transmission and receipt of the lens data signals DT2 of the predetermined bytes and the camera data signal DCL in the non-BUSY addition mode, the camera and lens microcomputers 205 and 111 switch their communication mode to the BUSY addition mode.

Next, description will be made of a data format of the camera data signal DCL. Specifications of the data format of the camera data signal DCL in one frame are common to those of the lens data signal DLC. However, the addition of the BUSY frame to the camera data signal DCL is prohibited, which is different from the lens data signal DLC.

Next, the communication procedures between the camera and lens microcomputers 205 and 111 in a normal communication process will be described. First, the communication procedures in the BUSY addition mode will be described.

The camera microcomputer 205 sets, when an event for starting the communication with the lens microcomputer 111 is generated, a signal level of the request-to-send signal RTS to Low (in other words, asserts the request-to-send signal RTS) to provide the transmission request to the lens microcomputer 111. The lens microcomputer 111 having detected the transmission request through the assertion (Low) of the request-to-send signal RTS performs a process to produce the lens data signal DLC to be transmitted to the camera microcomputer 205. Then, after a preparation for transmitting the lens data signal DLC is completed, the lens microcomputer 111 starts transmitting one byte (frame) of the lens data signal DLC through the first data communication channel.

The lens microcomputer 111 starts the transmission of the lens data signal DLC within a time period mutually set by the camera and lens microcomputers 205 and 111 after the assertion of the request-to-send signal RTS. That is, for the lens microcomputer 111, a strict restriction is not provided that it is necessary to set the lens data to be transmitted before a first clock pulse is input thereto in a time period from the assertion of the request-to-send signal RTS to a start of the transmission of the lens data signal DLC.

Next, in response to detecting the start bit ST as a head bit of the data frame of the lens data signal DLC received from the lens microcomputer 111 (that is, in response to a start of receiving the lens data signal DLC), the camera microcomputer 205 returns the signal level of the request-to-send signal RTS to High, in other words, negates the request-to-send signal RTS. The camera microcomputer 205 thereby terminates the transmission request after the start of the transmission of the lens data signal DLC, and starts transmission of the camera data signal DCL through the second data communication channel. The negation of the request-to-send signal RTS may be performed any one of before and after the start of the transmission of the camera data signal DCL. It is only necessary that these negation and transmission be performed until the receipt of the data frame of the lens data signal DLC is completed.

The lens microcomputer 111 having transmitted the data frame of the lens data signal DLC adds the BUSY frame to the lens data signal DLC in a case where the BUSY notice is required to be provided to the camera microcomputer 205. In a case where the BUSY notice is not required to be provided to the camera microcomputer 205, the lens microcomputer 111 does not add the BUSY frame to the lens data signal DLC. The camera microcomputer 205 monitors the presence and absence of the BUSY notice and prohibits the assertion of the request-to-send signal RTS for a subsequent transmission request while the BUSY notice is provided. The lens microcomputer 111 executes necessary processes in a time period where the communication from the camera microcomputer 205 is prohibited by the BUSY notice and terminates the BUSY notice after a subsequent communication preparation is completed. The assertion of the request-to-send signal RTS by the camera microcomputer 205 for the subsequent transmission request is permitted under a condition that the BUSY notice is terminated and the transmission of the data frame of the camera data signal DCL is completed.

As just described, in this embodiment, in response to the assertion of the request-to-send signal RTS upon the generation of the communication starting event in the camera microcomputer 205, the lens microcomputer 111 starts transmitting the data frame of the lens data signal DLC to the camera microcomputer 205. On the other hand, the camera microcomputer 205 starts, in response to detecting the start bit ST of the lens data signal DLC, transmitting the data frame of the camera data signal DCL to the lens microcomputer 111. The lens microcomputer 111 adds, as needed, the BUSY frame to the data frame of the lens data signal DLC for providing the BUSY notice and then terminates the BUSY notice to end one frame communication process. In this communication process, the camera microcomputer 205 and the lens microcomputer 111 mutually transmit and receive one byte data.

Next, the communication procedures in the non-BUSY addition mode will be described. The non-BUSY addition mode enables a higher-speed data communication as compared with the BUSY addition mode because the BUSY frame is not added. In the data format of the lens data signal DLC in the non-BUSY addition mode, one frame is formed only by the data frame, that is, does not include the BUSY frame. Therefore, in the non-BUSY addition mode, the lens microcomputer 111 cannot provide the BUSY notice to the camera microcomputer 205. This data format is used for burst communication as continuous communication in which each interval between frames is shortened so as to transmit relatively large volume data between the camera microcomputer 205 and the lens microcomputer 111. That is, the non-BUSY addition mode enables large volume data communication at a higher speed.

Next, with reference to FIGS. 5A and 5B, description will be made of a process (control method) from detection of a difference in communication mode to returning to a communication mode matched state.

Reference numerals 501 to 517 denote processes performed by the camera microcomputer 205 and the lens microcomputer 111. As described above, the communication mode in which the BUSY frame is added is the BUSY addition mode, and the communication mode in which BUSY frame is not added in the non-BUSY addition mode. Settings of parity bits in the respective communication mode are predetermined. Specifically, in the BUSY addition mode as one of the communication modes, even parity is added. On the other hand, in the non-BUSY addition mode as the other one of the communication modes, the parity bit is not added. These parity bit settings are merely example, and other parity bit settings may be employed. For example, in the BUSY addition mode the parity is not included, and in the non-BUSY addition mode even parity is added. Alternatively, in the BUSY addition mode even parity is added, and in the non-BUSY addition mode odd parity is added.

Figure 5A:
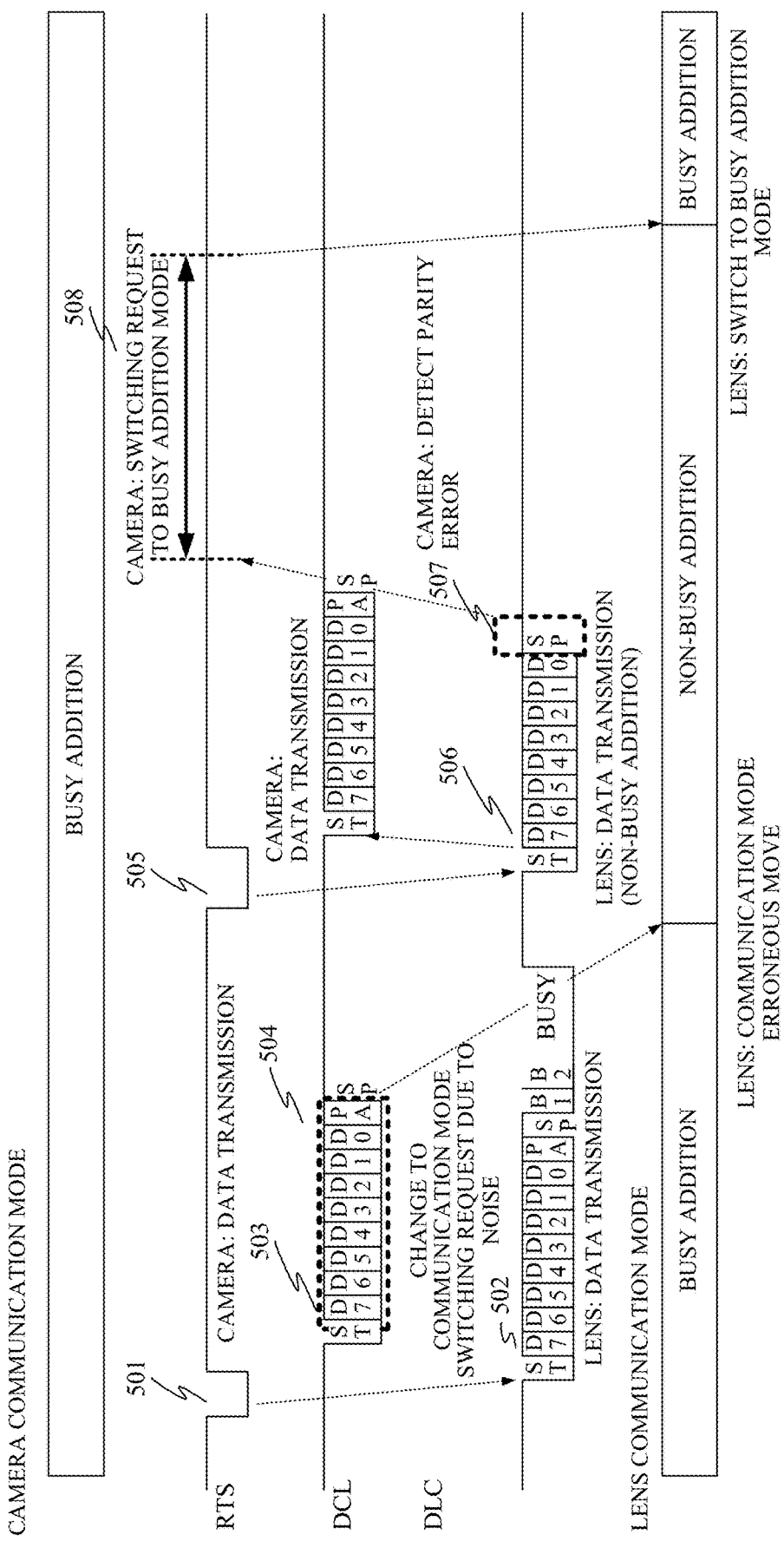
FIGS. 5A and 5B illustrate a process from detection of a difference in communication mode to returning to a communication mode matched state.

FIG. 5A illustrates a process in which the camera microcomputer 205 detects, when the lens microcomputer 111 erroneously switches its communication mode to the non-BUSY addition mode, a difference in communication mode and causes the lens microcomputer 111 to return to the BUSY addition mode. The initial communication modes of the camera and lens microcomputers 205 and 111 are both the BUSY addition mode. When the camera microcomputer 205 asserts the request-to-send signal RTS (501), the lens microcomputer 111 transmits the lens data signal DLC of one byte to the camera microcomputer 205 through the first data communication channel (502). In response thereto, the camera microcomputer 205 transmits the camera data signal DCL of one byte, which is data other than a communication mode switching request (described later), to the lens microcomputer 111 through the second data communication channel (503). In this transmission of the camera data signal DCL, there is a case where a noise generated in the second data communication channel (communication path) transforms the camera data signal DCL to data that means the communication mode switching request for switching the communication mode to the non-BUSY addition mode (504). In this case, the lens microcomputer 111 erroneously switches its communication mode to the non-BUSY addition mode.

Thereafter, when the camera microcomputer 205 asserts the request-to-send signal RTS to notify the lens microcomputer 111 of a start of a next communication (505), the lens microcomputer 111 in the non-BUSY addition mode transmits the lens data signal DLC of one byte to the camera microcomputer 205 (506). The camera microcomputer 205 detects a parity error in the received lens data signal DLC (507) to recognize (detect) a difference in communication mode between the camera and lens microcomputers 205 and 111. The camera microcomputer 205 having recognized the difference in communication mode keeps the request-to-send signal RTS negated for a predetermined time (508) to return (switch) the communication mode of the lens microcomputer 111 to the BUSY addition mode. This process enables correcting the difference in communication mode between the camera and lens microcomputers 205 and 111.

Figure 5B:
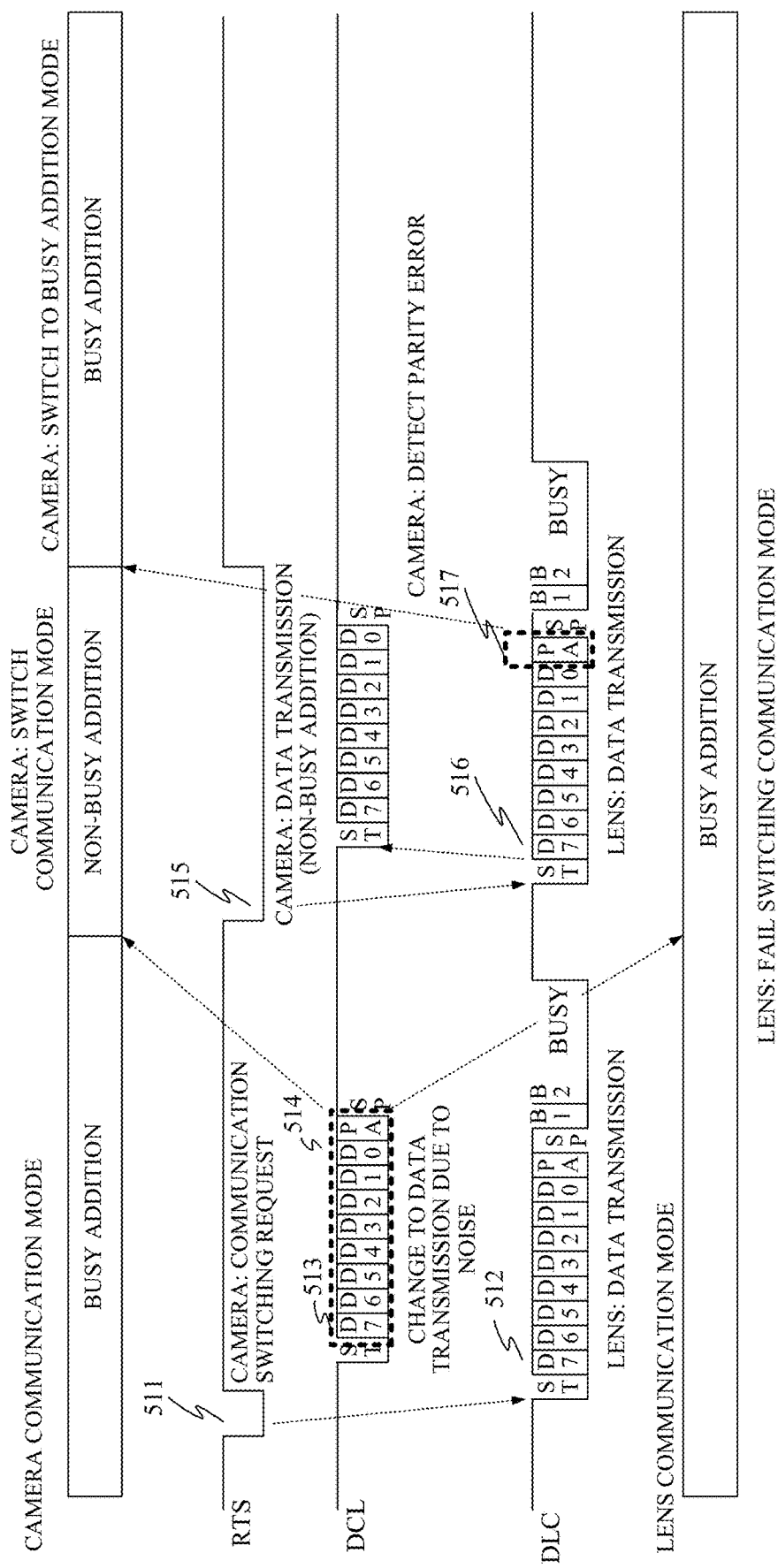

FIG. 5B illustrates a process in which the camera microcomputer 205 having failed causing the lens microcomputer 111 to switch to the non-BUSY addition mode detects the difference in communication mode between the camera and lens microcomputers 205 and 111 and then causes the lens microcomputer 111 to return to the BUSY addition mode. The initial communication modes of the camera and lens microcomputers 205 and 111 are both the BUSY addition mode. When the camera microcomputer 205 that has to switch the communication mode from the BUSY addition mode to the non-BUSY addition mode to communicate with the lens microcomputer 111 asserts the request-to-send signal RTS (511), the lens microcomputer 111 transmits the lens data signal DLC of one byte to the camera microcomputer 205 through the first data communication channel (512). In response thereto, the camera microcomputer 205 transmits the camera data signal DCL of one byte, which means the communication mode switching request for switching to the non-BUSY addition mode, to the lens microcomputer 111 through the second data communication channel (513). In this transmission of the camera data signal DCL, when the noise generated in the second data communication channel transforms the camera data signal DCL to data that does not mean the communication mode switching request for switching to the non-BUSY addition mode (the parity information PA is also different) (514), the communication mode of the lens microcomputer 111 does not switch to the non-BUSY addition mode. That is, only the communication mode of the camera microcomputer 205 switches to the non-BUSY addition mode.

Thereafter, when the camera microcomputer 205 asserts the request-to-send signal RTS (515), the lens microcomputer 111 in the BUSY addition mode transmits the lens data signal DLC of one byte including the parity bit to the camera microcomputer 205 (516). The camera microcomputer 205 detects a parity error in the received lens data signal DLC (517) and thereby recognizes a difference in communication mode between the camera and lens microcomputers 205 and 111. The camera microcomputer 205 having recognized the difference in communication mode returns (switches) its communication mode to the BUSY addition mode. This process enables correcting the difference in communication mode between the camera and lens microcomputers 205 and 111. The camera microcomputer 205 keeps the request-to-send signal RTS asserted until returning its communication mode to the BUSY addition mode, and then negates the request-to-send signal RTS.

Figure 6A:
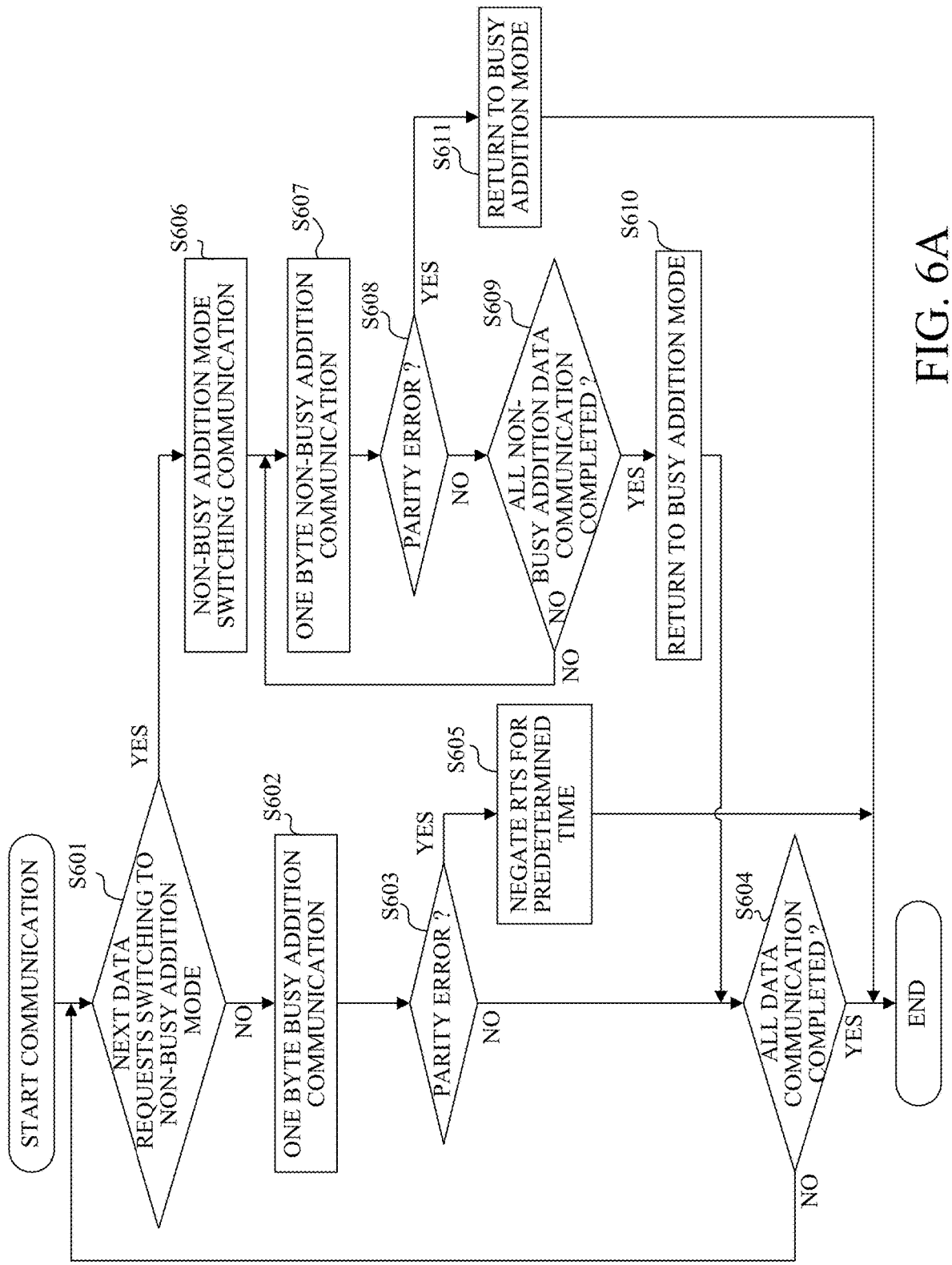
FIGS. 6A and 6B are flowcharts illustrating processes performed respectively by a camera microcomputer and a lens microcomputer in Embodiment 1.

FIG. 6A is a flowchart illustrating a camera communication mode matching process performed by the camera microcomputer 205 for detecting the difference in communication mode between the camera and lens microcomputers 205 and 111 and correcting the difference (that is, returns the communication mode of the lens microcomputer 111 to the same one as that of the camera microcomputer 205). The camera microcomputer 205 executes this process according to a camera communication control program as a computer program. In the following description, "S" represents a step. When the process is started, the communication mode of the camera microcomputer 205 is the BUSY addition mode.

At S601, the camera microcomputer 205 determines whether or not the camera data signal DCL of one byte to be next transmitted to the lens microcomputer 111 is the communication mode switching request for switching to the non-BUSY addition mode (hereinafter referred to as "a non-BUSY addition mode switching request"). If the camera data signal DCL is the non-BUSY addition mode switching request, the camera microcomputer 205 proceeds to S606, and otherwise proceeds to S602.

At S602, the camera microcomputer 205 in the BUSY addition mode asserts the request-to-send signal RTS, receives the lens data signal DLC from the lens microcomputer 111 and transmits the camera data signal DCL to the lens microcomputer 111. After receiving and transmitting the lens and camera data signals DLC and DCL, the camera microcomputer 205 proceeds to S603.

At step S603, the camera microcomputer 205 determines whether or not the lens data signal DLC received from the lens microcomputer 111 includes a parity error. If the lens data signal DLC includes the parity error, the camera microcomputer 205 proceeds to S605, and otherwise proceeds to S604.

At S604, the camera microcomputer 205 determines whether or not the receipt and transmission of all the lens and camera data signals DLC and DCL have been completed. If the receipt and transmission of all the lens and camera data signals DLC and DCL have been completed, the camera microcomputer 205 ends this process, and otherwise returns to S601 to receive and transmit the lens and camera data signals DLC and DCL of subsequent bytes.

On the other hand, at S605, the camera microcomputer 205 recognizes that the lens microcomputer 111 has erroneously switched to the non-BUSY addition mode, and thereby keeps the request-to-send signal RTS negated for a predetermined time in order to return the communication mode of the lens microcomputer 111 to the BUSY addition mode. Then, the camera microcomputer 205 ends this process. After ending the process, the camera microcomputer 205 may restart the communication with the lens microcomputer 111 and may reset software or hardware of the interchangeable lens 100.

On the other hand, at S606, the camera microcomputer 205 asserts the request-to-send signal RTS to receive the lens data signal DLC from the lens microcomputer 111, and then transmits the camera data signal DCL that means the non-BUSY addition mode switching request. Thereafter, the camera microcomputer 205 switches its communication mode to the non-BUSY addition mode, and then proceeds to S607.

At S607, the camera microcomputer 205 having switched to the non-BUSY addition mode asserts the request-to-send signal RTS to receive the lens data signal DLC of one byte from the lens microcomputer 111, and then transmits the camera data signal DCL of one byte to the lens microcomputer 111. If the camera microcomputer 205 has to interrupt the communication at this time, the camera microcomputer 205 negates the request-to-send signal RTS. If the camera microcomputer 205 can restart the communication, the camera microcomputer 205 asserts the request-to-send signal RTS. After the receipt and transmission of the lens and camera data signals DLC and DCL, the camera microcomputer 205 proceeds to S608.

At S608, the camera microcomputer 205 determines whether or not the received lens data signal DLC includes a parity error. If the lens data signal DLC includes the parity error, the camera microcomputer 205 proceeds to S611, and otherwise proceeds to S609.

At S609, the camera microcomputer 205 determines whether or not the receipt and transmission of all bytes of the lens and camera data signals DLC and DCL in the non-BUSY addition mode have been completed. If the receipt and transmission of all the bytes have been completed, the camera microcomputer 205 at S610 returns its communication mode to the BUSY addition mode and then proceeds to S604, and otherwise returns to S607. At S607, the camera microcomputer 205 starts communication of subsequent bytes. Since the number of bytes communicated in the non-BUSY communication mode is set at the start of the communication, the lens microcomputer 111 returns its communication mode to the non-BUSY addition mode after the receipt and transmission of all bytes have been completed.

At S611, the camera microcomputer 205 recognizes that the lens microcomputer 111 has failed switching its communication mode to the non-BUSY addition mode, and then returns its communication mode to the BUSY addition mode to end this process. After ending the process, the camera microcomputer 205 may restart the communication with the lens microcomputer 111 and may reset software or hardware of the interchangeable lens 100.

Figure 6B:
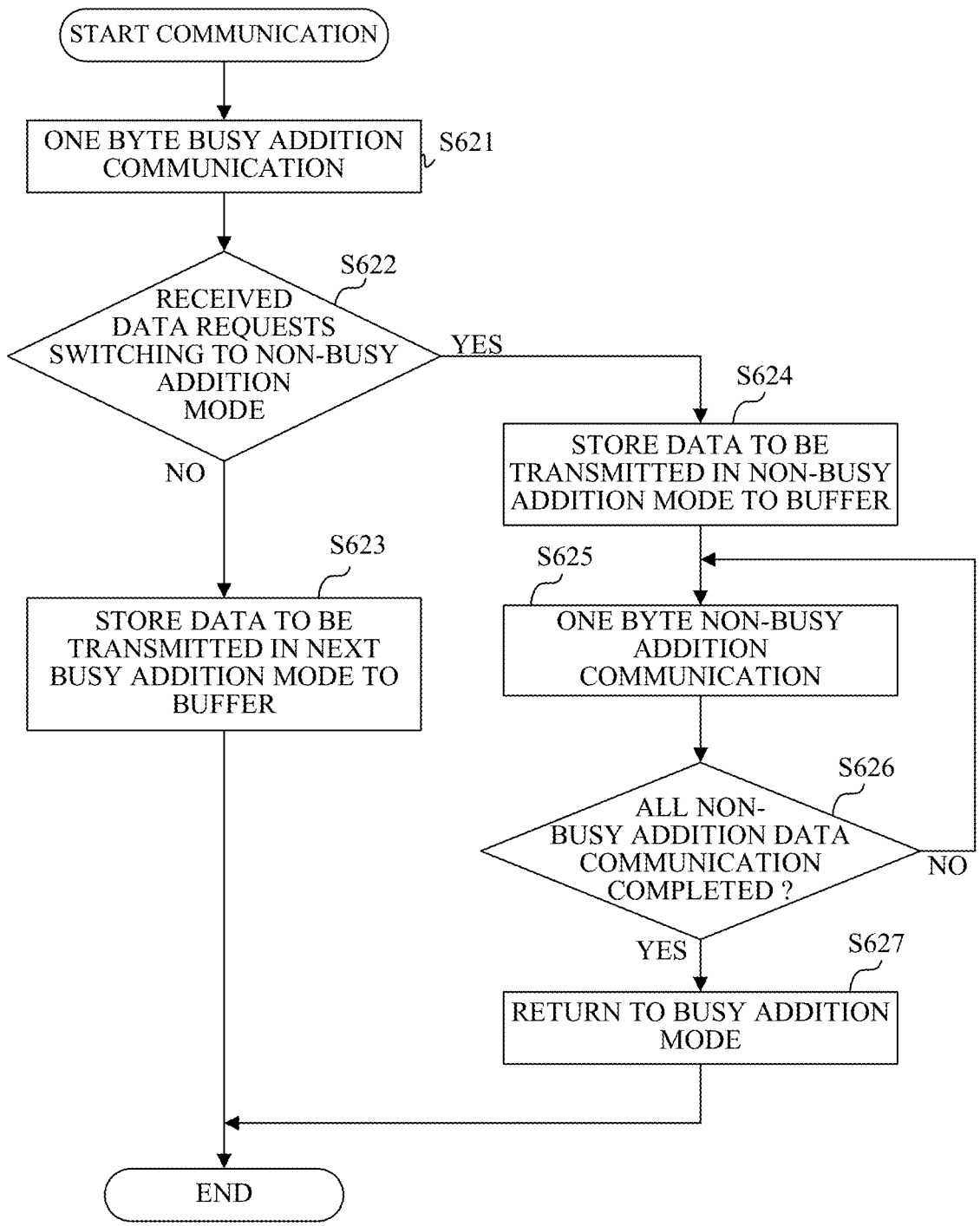

FIG. 6B is a flowchart illustrating a lens (accessory) communication mode matching process performed by the lens microcomputer 111 for correcting the difference in communication mode in response to the camera communication mode matching process illustrated in FIG. 6A and performed by the camera microcomputer 205. The lens microcomputer 111 executes this process according to a lens (accessory) communication control program as a computer program. When the process is started, the communication mode of the lens microcomputer 111 is the BUSY addition mode.

At S621, the lens microcomputer 111 transmits in the BUSY addition mode, in response to assertion of the request-to-send signal RTS, the lens data signal DLC of one byte to the camera microcomputer 205. Furthermore, the lens microcomputer 111 receives the camera data signal DCL of one byte from the camera microcomputer 205. After transmitting and receiving the lens and camera data signals DLC and DCL, the lens microcomputer 111 proceeds to S622.

At S622, the lens microcomputer 111 determines whether or not the received camera data signal DCL is the non-BUSY addition mode switching request. If the camera data signal DCL is the non-BUSY addition mode switching request, the lens microcomputer 111 proceeds to S624, and otherwise proceeds to S623.

At S623, the lens microcomputer 111 stores, to the transmission data buffer 312, the lens data signal DLC to be next transmitted as a reply for the received camera data signal DCL, and then ends this process.

At S624, the lens microcomputer 111 switches its communication mode to the non-BUSY addition mode, and stores, to the transmission data buffer 312, the lens data signal DLC to be transmitted in the non-BUSY addition mode. Thereafter, the lens microcomputer 111 proceeds to S625.

At S625, the lens microcomputer 111 monitors the request-to-send signal RTS. When the request-to-send signal RTS is asserted, the lens microcomputer 111 transmits in the non-BUSY addition mode, to the camera microcomputer 205, the lens data signal DLC of one byte stored in the transmission data buffer 312. Furthermore, the lens microcomputer 111 receives the camera data signal DCL of one byte from the camera microcomputer 205. After transmitting and receiving the lens and camera data signals DLC and DCL, the lens microcomputer 111 proceeds to S626.

At S626, the lens microcomputer 111 determines whether or not the transmission of all byte of the lens data signal DLC in the non-BUSY addition mode to the camera microcomputer 205 has been completed. If the transmission has not been yet completed, the lens microcomputer 111 returns to S625. On the other hand, if the transmission of all the byte has been completed, the lens microcomputer 111 at S627 returns its communication mode to the BUSY addition mode, and then ends this process.

This embodiment provides, in the respective communication modes for the communication between the camera and lens microcomputers 205 and 111, mutually different settings of the parity bits (that is, the parity bit is added or not added, or indicates even or odd parity). Thereby, this embodiment enables detecting that the difference in communication mode occurs at a high frequency. Accordingly, this embodiment enables detecting the difference in communication mode in a short time from its occurrence and enables quickly providing a state where the communication modes of the camera and lens microcomputers 205 and 111 are matched to each other.

Embodiment 2

Next, description will be made of a second embodiment (Embodiment 2) of the present invention. The camera body 200 and the interchangeable lens 100 have the same configurations as those described with reference to FIGS. 1 to 3 in Embodiment 1. This embodiment performs, in addition to the correction of the difference in communication mode, a quick restoration of an abnormal camera data signal DCL (DCL error) to a normal one. Specifically, in addition to the detection of the difference in communication mode performed by the camera microcomputer 205, the lens microcomputer 111 also monitors the DCL error, and purposely provides, when detecting the DCL error, an error parity as the parity information PA of the camera data signal DCL. This enables more quickly restoring the camera data signal DCL, that is, the communication between the camera and lens microcomputers 205 and 111 to a normal state.

Description will be made of a process (control method) from the detection of the DCL error to the restoration thereof to the normal state with reference to FIGS. 7A and 7B. Reference numerals 701 to 719 represent processes performed by the camera and lens microcomputers 205 and 111. Also in this embodiment, the communication mode in which the BUSY frame is added is referred to as the BUSY addition mode, and the communication mode in which the BUSY frame is not added is referred to as the non-BUSY addition mode.

Furthermore, also in this embodiment, the settings of the parity bits for the respective communication modes are predetermined. In the BUSY addition mode, even parity bit is added. In the non-BUSY addition mode, the parity bit is not added. As well as in Embodiment 1, the above-described settings of the parity bits are merely an example, and other settings may be employed.

Figure 7A:
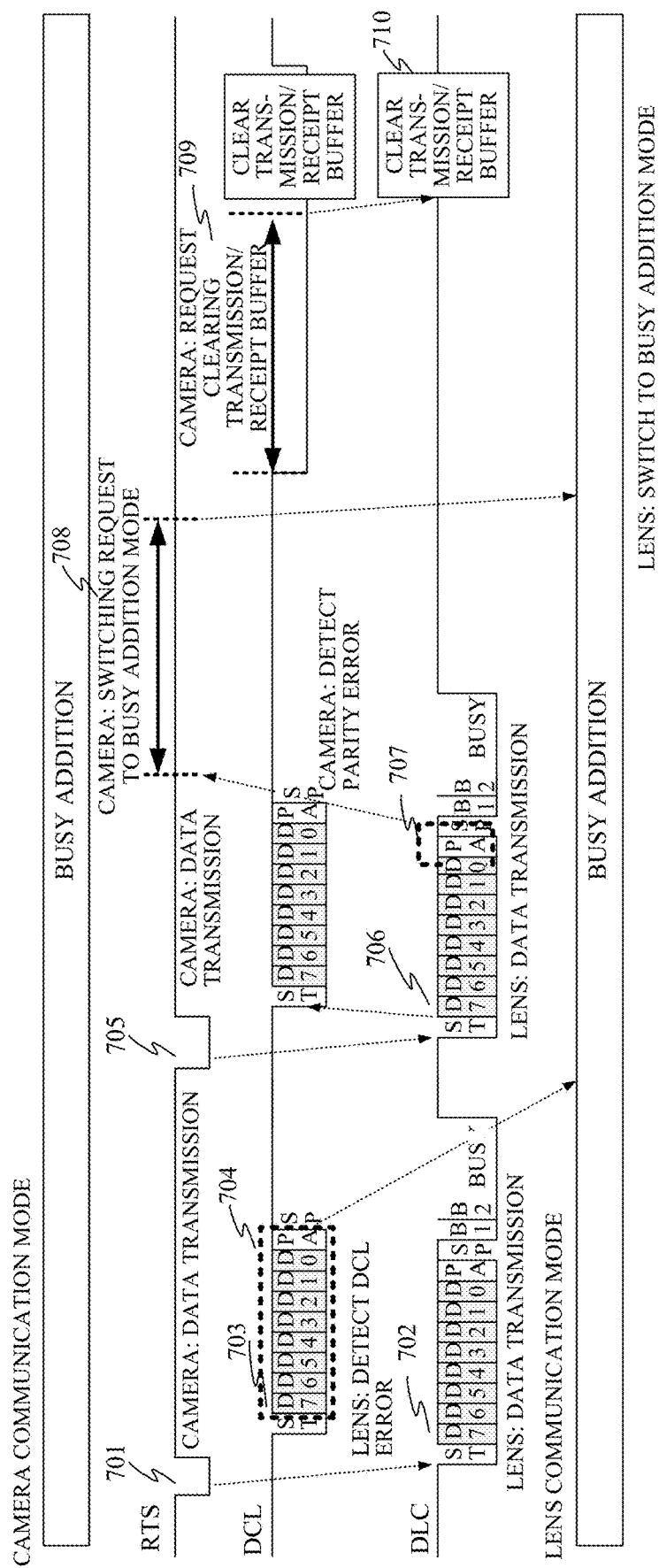
FIGS. 7A and 7B illustrate a process from detection of a DCL error to returning to a normal state in Embodiment 2 of the present invention.

FIG. 7A illustrates a process performed by the lens microcomputer 111 from the detection of the DCL error in the BUSY addition mode to the restoration thereof to the normal state. The initial communication modes of the camera and lens microcomputers 205 and 111 are both the BUSY addition mode.

When the camera microcomputer 205 asserts the request-to-send signal RTS (701), the lens microcomputer 111 transmits the lens data signal DLC of one byte to the camera microcomputer 205 through the first data communication channel (702). In response thereto, the camera microcomputer 205 transmits the camera data signal DCL of one byte to the lens microcomputer 111 through the second data communication channel (703). In this transmission of the camera data signal DCL, if a noise generated in the second data communication channel transforms the camera data signal DCL to an abnormal data signal, the lens microcomputer 111 detects the abnormal data signal as the DCL error (704). The DCL error is data indicating a parity error or a framing error, or data not to be transmitted. The lens microcomputer 111 having detected the DCL error purposely produces the lens data signal DLC of one byte that causes the camera microcomputer 205 to detect the parity error, and stores the lens data signal DLC to the transmission data buffer 312.

Next, when the camera microcomputer 205 asserts the request-to-send signal RTS (705), the lens microcomputer 111 transmits the lens data signal DLC including the parity error and stored in the transmission data buffer 312 to the camera microcomputer 205 (706). The camera microcomputer 205 having received this lens data signal DLC detects the parity error included therein (707), and recognizes (detects) a difference in communication mode between the camera and lens microcomputers 205 and 111.

The camera microcomputer 205 having recognized the difference in communication mode keeps the request-to-send signal RTS negated for a predetermined time (708), and resets the communication mode of the lens microcomputer 111 to the BUSY addition mode. The initial communication mode of the lens microcomputer 111 is the BUSY addition mode, and this process again sets the BUSY addition mode of the lens microcomputer 111. This is not a problem.

Furthermore, the camera microcomputer 205 keeps a signal level of the camera data signal DCL low for a predetermined time (709), and then clears (discards) the camera data signal DCL stored in the transmission data buffer 302 for a next transmission. The lens microcomputer 111 having received the camera data signal DCL kept low for the predetermined time clears the transmission data buffer 312 (710). The above process restores the camera and lens microcomputers 205 and 111 from the state where the DCL error occurs to the normal state.

Figure 7B:
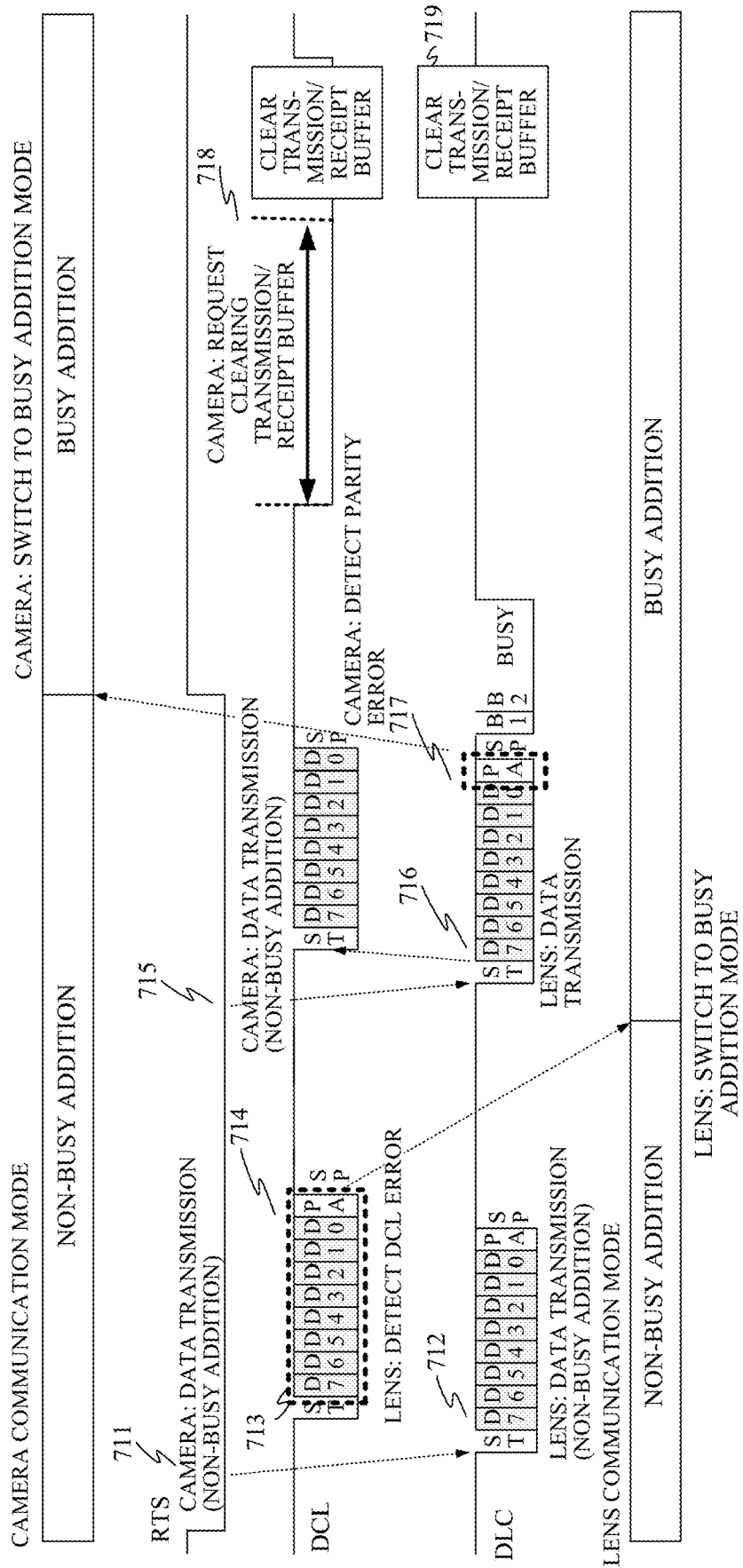

FIG. 7B illustrates a process performed by the lens microcomputer 111 from the detection of the DCL error in the non-BUSY addition mode to the restoration thereof to the normal state. The initial communication modes of the camera and lens microcomputers 205 and 111 are both the non-BUSY addition mode. When the camera microcomputer 205 asserts the request-to-send signal RTS (711), the lens microcomputer 111 transmits the lens data signal DLC of one byte to the camera microcomputer 205 through the first data communication channel (712). In response thereto, the camera microcomputer 205 transmits the camera data signal DCL of one byte to the lens microcomputer 111 through the second data communication channel (713). At this time, when the noise generated in the second data communication channel transforms the camera data signal DCL to abnormal data such as data including the parity error or the framing error, the lens microcomputer 111 detects it as the DCL error (714). The lens microcomputer 111 having detected the DCL error switches its communication mode to the BUSY addition mode to purposely produce the lens data signal DLC that causes the camera microcomputer 205 to detect the parity error, and stores the lens data signal DLC to the transmission data buffer 312.

At this time, when the camera microcomputer 205 asserts the request-to-send signal RTS (715), the lens microcomputer 111 transmits the lens data signal DLC including the parity error and stored in the transmission data buffer 312 to the camera microcomputer 205 (716). The camera microcomputer 205 having received this lens data signal DLC detects the parity error included therein (717) to recognize a difference in communication mode between the camera and lens microcomputers 205 and 111.

The camera microcomputer 205 having recognized the difference in communication mode switches its communication mode to the BUSY addition mode.

Furthermore, the camera microcomputer 205 keeps the signal level of the camera data signal DCL low for a predetermined time (718), and then clears the camera data signal DCL stored in the transmission data buffer 302 for a next transmission. The lens microcomputer 111 having received the camera data signal DCL kept low for the predetermined time clears the transmission data buffer 312 (719). The above process restores the camera and lens microcomputers 205 and 111 from the state where the DCL error occurs to the normal state.

Figure 8A:
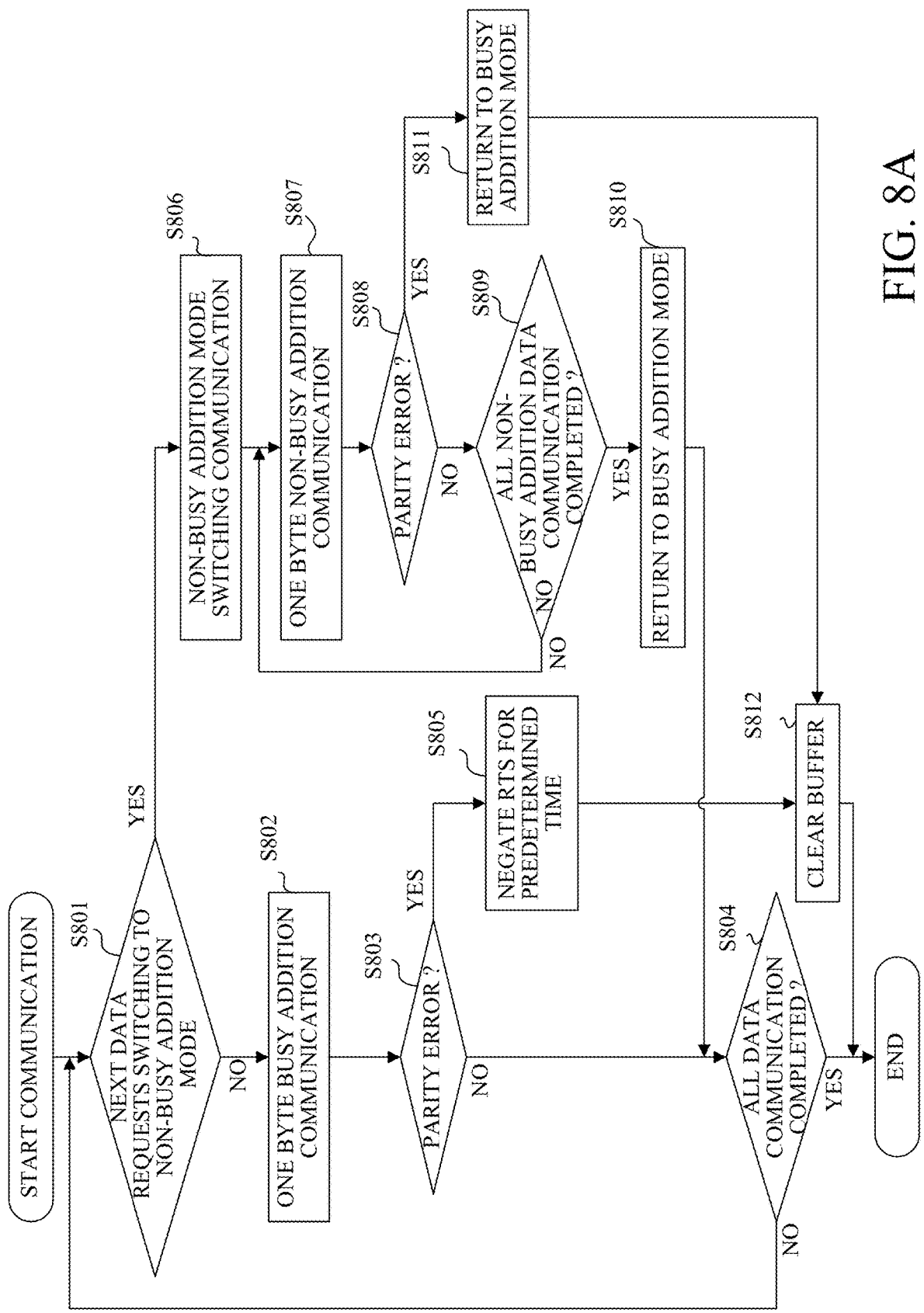
FIGS. 8A and 8B are flowcharts illustrating processes performed respectively by a camera microcomputer and a lens microcomputer in Embodiment 2.

FIG. 8A is a flowchart illustrating a camera communication mode matching process performed by the camera microcomputer 205 for correcting the DCL error, in addition to correcting the difference in communication mode between the camera and lens microcomputers 205 and 111. The camera microcomputer 205 executes this process according to a camera communication control program as a computer program. When the process is started, the communication mode of the camera microcomputer 205 is the BUSY addition mode.

Processes at S801 to S804 are the same as those at S601 to S604 in Embodiment 1 (FIG. &A), and description thereof is omitted.

The camera microcomputer 205 proceeding from S803 to S805 recognizes that the lens microcomputer 111 has erroneously switched to the non-BUSY addition mode, and thereby keeps the request-to-send signal RTS negated for a predetermined time in order to return the communication mode of the lens microcomputer 111 to the BUSY addition mode. Then, the camera microcomputer 205 proceeds to S812.

Processes at S806 to S810 are the same as those at S606 to S610 in Embodiment 1 (FIG. &A), and description thereof is omitted.

The camera microcomputer 205 proceeding from S808 to S811 recognizes that the lens microcomputer 111 has failed switching its communication mode to the non-BUSY addition mode. The camera microcomputer 205 returns its communication mode to the BUSY addition mode. Then, the camera microcomputer 205 proceeds to S812.

At S812, the camera microcomputer 205 keeps the signal level of the camera data signal DCL high for a predetermined time in order to reset the receipt and transmission data buffers 311 and 312 in the lens microcomputer 111. Furthermore, the camera microcomputer 205 clears the receipt and transmission data buffers 302 and 303 on its side, and then ends this process.

Figure 8B:
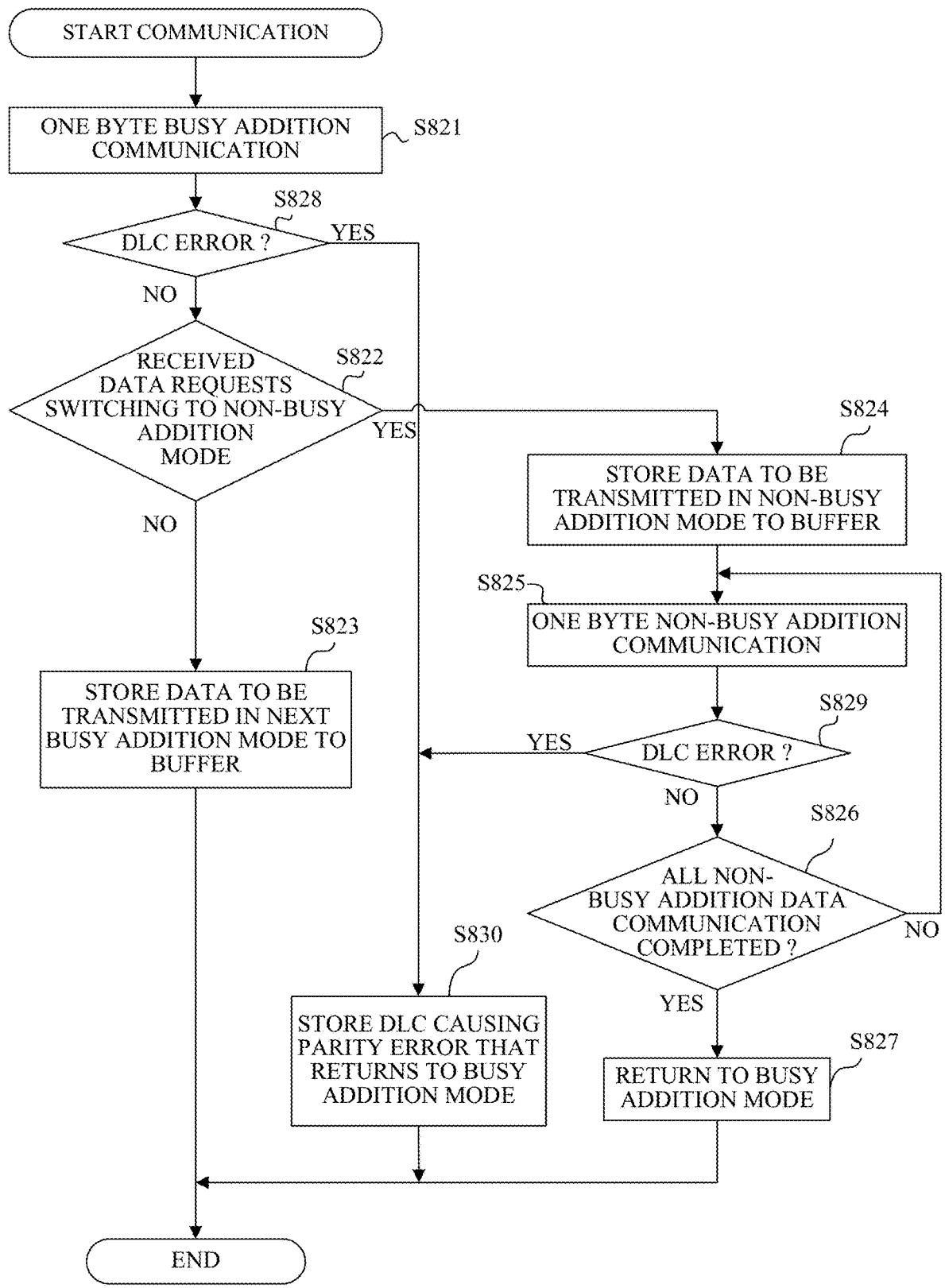

After ending the process, the camera microcomputer 205 may restart the communication with the lens microcomputer 111 and may reset software or hardware of the interchangeable lens 100. FIG. 8B is a flowchart illustrating a lens communication mode matching process performed by the camera microcomputer 205 for correcting the DCL error, in addition to correcting the difference in communication mode between the camera and lens microcomputers 205 and 111, in response to the camera communication mode matching process illustrated in FIG. 8A and performed by the camera microcomputer 205. The lens microcomputer 111 executes this process according to a lens communication process program as a computer program. When the process is started, the communication mode of the lens microcomputer 111 is the BUSY addition mode.

At S821, the lens microcomputer 111 transmits in the BUSY addition mode, in response to assertion of the request-to-send signal RTS by the camera microcomputer 205, the lens data signal DLC of one byte to the camera microcomputer 205. Furthermore, the lens microcomputer 111 receives the camera data signal DCL of one byte from the camera microcomputer 205. After transmitting and receiving the lens and camera data signals DLC and DCL, the lens microcomputer 111 proceeds to S828.

At S828, the lens microcomputer 111 determines whether or not the DCL error occurs. If the DCL error occurs, the lens microcomputer 111 proceeds to S830, and otherwise proceeds to S822.

Processes at S822 to S824 are the same as those at S622 to S624 in Embodiment 1 (FIG. &A), and description thereof is omitted.

The lens microcomputer 111 proceeding from S824 to S825 monitors the request-to-send signal RTS. When the request-to-send signal RTS is asserted, the lens microcomputer 111 transmits, to the camera microcomputer 205 in the non-BUSY addition mode, the lens data signal DLC of one byte stored in the transmission data buffer 312. Furthermore, the lens microcomputer 111 receives the camera data signal DCL of one byte from the camera microcomputer 205. After transmitting and receiving the lens and camera data signals DLC and DCL, the lens microcomputer 111 proceeds to S829.

At S829, the lens microcomputer 111 determines whether or not the DCL error occurs. If the DCL error occurs, the lens microcomputer 111 proceeds to S830, and otherwise proceeds to S826.

Processes at S826 and S827 are the same as those at S626 and S627 in Embodiment 1 (FIG. 6A), and description thereof is omitted.

At S830, the lens microcomputer 111 returns its communication mode to the BUSY addition mode, and purposely produces the lens data signal DLC that causes the camera microcomputer 205 to detect the parity error. Then, the lens microcomputer 111 stores this lens data signal DLC to the transmission data buffer 312. Thereafter, the lens microcomputer 111 ends this process. When, at a next communication, the lens microcomputer 111 transmits the lens data signal DLC stored in the transmission data buffer 312 to the camera microcomputer 205, the camera microcomputer 205 detects the parity error in the received lens data signal DLC. This process enables returning the communication between the camera and lens microcomputers 205 and 111 to a normal state.

In this embodiment, the lens microcomputer 111 also monitors the DCL error as a communication error, and produces, when detecting the DCL error, the lens data signal DLC including the parity error. This enables the camera microcomputer 205 to detect the parity error in the lens data signal DLC. Thereafter, the camera and lens microcomputers 205 and 111 perform the same processes as those in Embodiment 1, which enables restoring the abnormality (DLC error) of the communication between the camera and lens microcomputers 205 and 111 to the normal state.

Although the above embodiments described the case where the accessory apparatus is the interchangeable lens, the accessory apparatus may be other apparatuses such as a flash device (illumination apparatus).

Each of the above-described embodiments provides the different settings of the parity bits for the respective communication modes, and thereby enables detecting the parity error in the lens data signal DLC. This enables quickly detecting the difference in communication mode between the camera body 200 and the interchangeable lens 100. Accordingly, each of the embodiments enables quickly returning the camera body 200 and the interchangeable lens 100 to the state where their communication modes are matched to each other.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-145147, filed on Jul. 25, 2016, which is hereby incorporated by reference herein in its entirety.

What is claimed is:
1. An image-capturing apparatus to which an accessory apparatus is attachable, the image-capturing apparatus comprising:
a memory that stores instructions; and a camera controller configured to execute the instructions stored in the memory to receive first data via a first communication channel and to transmit second data via a second communication channel, wherein the camera controller is configured to perform communication by a first communication mode and a second communication mode, wherein the first communication mode is a communication mode where the camera controller (a) receives the first data in accordance with a change of signal level of a third communication channel from a first signal level to a second signal level and (b) transmits the second data in accordance with the reception of the first data, wherein the second communication mode is a communication mode where the camera controller (a) receives the first data in accordance with maintenance of the third communication channel at the second signal level after the change of signal level of the third communication channel from the first signal level to the second signal level and (b) transmits the second data in accordance with the reception of the first data, and wherein setting of a parity bit of the first data in the first communication mode and setting of a parity bit of the first data in the second communication mode are different.

2. An image-capturing apparatus according to claim 1, wherein the setting of a parity bit of the first data in the first communication mode and the setting of a parity bit of the first data in the second communication mode are different in that the parity bit is added or not added or in that the parity bit indicates even parity or odd parity.

3. An image-capturing apparatus according to claim 1, wherein the parity bit in one of the first and second communication modes indicates even parity or odd parity, and the parity bit in the other thereof is not included.

4. An image-capturing apparatus according to claim 1, wherein the camera controller is configured to detect a parity error of the first data and thereby detect a difference in communication mode between the camera controller and the accessory apparatus.

5. An image-capturing apparatus according to claim 4, wherein the camera controller is configured to perform, in response to detecting the difference in communication mode, a matching process for matching the communication modes of the camera controller and the accessory apparatus.

6. An image-capturing apparatus according to claim 5, wherein the camera controller is configured to perform, in response to detecting the difference in communication mode when the communication mode of the camera controller is the first communication mode, the matching process that changes the communication mode of the accessory apparatus to the first communication mode.

7. An image-capturing apparatus according to claim 5, wherein the camera controller is configured to perform, in response to detecting the difference in communication mode when the communication mode of the camera controller is the second communication mode, the matching process that changes the communication mode of the camera controller to the first communication mode.

8. An image-capturing apparatus according to claim 1, wherein the camera controller is configured to perform asynchronous communication with the accessory apparatus, and wherein the camera controller is configured to output a signal via the third communication channel.

9. An image-capturing apparatus according to claim 8, wherein the camera controller is configured to:

in the first communication mode, receive from the accessory apparatus the first data to which a communication standby request is added;

in the second communication mode, receive from the accessory apparatus the first data to which the communication standby request is not added;

in the first communication mode, not provide a communication request until the communication standby request is terminated; and in the second communication mode, continue providing the communication request to the accessory apparatus by the maintenance of the third communication channel at the second signal level until the communication of a predetermined amount is performed, and switch, in response to completion of the communication of the predetermined amount, the communication mode of the camera controller to the first communication mode.

10. An image-capturing apparatus according to claim 8, wherein the camera controller is configured to perform, in response to detecting a difference in communication mode in the first communication mode, a matching process that does not provide the communication request for a predetermined time and thereby switches the communication mode of the accessory apparatus to the first communication mode.

11. An accessory apparatus attachable to an image-capturing apparatus, the accessory apparatus comprising:

a memory that stores instructions; and an accessory controller configured to execute the instructions stored in the memory to transmit first data via a first communication channel and to receive second data via a second communication channel, wherein the accessory controller is configured to perform communication by a first communication mode and a second communication mode, wherein the first communication mode is a communication mode where the accessory controller (a) transmits the first data in accordance with a change of signal level of a third communication channel from a first signal level to a second signal level and (b) receives the second data in accordance with the reception of the first data, wherein the second communication mode is a communication mode where the accessory controller transmits the first data in accordance with maintenance of the third communication channel at the second signal level after the change of signal level of the third communication channel from the first signal level to the second signal level, and wherein setting of a parity bit of the first data in the first communication mode and setting of a parity bit of the first data in the second communication mode are different.

12. An accessory apparatus according to claim 11, wherein the setting of a parity bit of the first data in the first communication mode and the setting of a parity bit of the first data in the second communication mode are different in that the parity bit is added or not added or in that the parity bit indicates even parity or odd parity.

13. An accessory apparatus according to claim 11, wherein the parity bit in one of the first and second communication modes indicates even parity or odd parity, and the parity bit in the other thereof is not included.

14. An accessory apparatus according to claim 11, wherein the accessory controller is configured to switch the communication mode of the accessory controller, in response to receiving a switch request that requests switching the communication mode on the detection of a parity error of the first data.

15. An accessory apparatus according to claim 14, wherein the accessory controller is configured to switch, in response to receiving the switch request on the detection of the difference in communication mode in the first communication mode, the communication mode of the accessory controller to the first communication mode.

16. An accessory apparatus according to claim 11, wherein the accessory controller is configured to perform asynchronous communication with the image-capturing apparatus, and
wherein the camera controller is configured to output a signal via the third communication channel.

17. An accessory apparatus according to claim 16, wherein the accessory controller is configured (a) to transmit, in the first communication mode, the first data to which a communication standby request that requests prohibiting the image-capturing apparatus from providing the communication request is added, and (b) to transmit, in the second communication mode, the first data to which the communication standby request is not added while the communication request is provided from the image-capturing apparatus.

18. An accessory apparatus according to claim 16, wherein the accessory controller is configured to perform, in response to not receiving the communication request for a predetermined time from the image-capturing apparatus that detects in the first communication mode a difference in communication mode, a switching process that switches the communication mode of the accessory controller to the first communication mode.

19. An accessory apparatus according to claim 11, wherein the accessory controller is configured to transmit, in response to detecting abnormality of image-capturing apparatus data, the first data produced so as to cause the image-capturing apparatus to detect a parity error.

20. An image-capturing system including an image-capturing apparatus and an accessory apparatus attachable to the image-capturing apparatus, the system comprising:
a memory that stores instructions; and
a camera controller and an accessory controller configured to execute the instructions stored in the memory, the camera controller being included in the image-capturing apparatus and the accessory controller being included in the accessory apparatus, the camera controller being configured to receive first data via a first communication channel and to transmit second data via a second communication channel, and the accessory controller being configured to transmit the first data via the first communication channel and to receive the second data via the second communication channel,
wherein the camera controller and the accessory controller are configured to perform communication by a first communication mode and a second communication mode,
wherein the first communication mode is a communication mode where the camera controller (a) receives the first data in accordance with a change of signal level of a third communication channel from a first signal level to a second signal level and (b) transmits the second data in accordance with the reception of the first data,
wherein the second communication mode is a communication mode where the camera controller (a) receives the first data in accordance with maintenance of the third communication channel at the second signal level after the change of signal level of the third communication channel from the first signal level to the second signal level and (b) transmits the second data according to the reception of the first data, and
wherein setting of a parity bit of the first data in the first communication mode and setting of a parity bit of the first data in the second communication mode are different.

21. A control method of controlling an image-capturing apparatus to which an accessory apparatus is attachable, the control method comprising the steps of:
receiving first data via a first communication channel and transmitting second data via a second data communication channel,
wherein the control method is configured to perform communication by a first communication mode and a second communication mode,
wherein the first communication mode is a communication mode where (a) the first data is received in accordance with a change of signal level of a third communication channel from a first signal level to a second signal level and (b) the second data is transmitted in accordance with the reception of the first data,
wherein the second communication mode is a communication mode where (a) the first data is received in accordance with maintenance of the third communication channel at the second signal level after the change of signal level of the third communication channel from the first signal level to the second signal level and (b) the second data is transmitted in accordance with the reception of the first data, and
wherein setting of a parity bit of the first data in the first communication mode and setting of a parity bit of the first data in the second communication mode are different.

22. A control method of controlling an accessory apparatus attachable to an image-capturing apparatus, the control method comprising the steps of:
transmitting first data via a first communication channel and receiving second data via a second communication channel,
wherein the control method is configured to perform communication by a first communication mode and a second communication mode,
wherein the first communication mode is a communication mode where (a) a camera controller in the image-capturing apparatus receives the first data in accordance with a change of signal level of a third communication channel from a first signal level to a second signal level and (b) transmits the second data in accordance with the reception of the first data,
wherein the second communication mode is a communication mode where (a) the camera controller receives the first data in accordance with maintenance of the third communication channel at the second signal level after the change of signal level of the third communication channel from the first signal level to the second signal level and (b) transmits the second data in accordance with the reception of the first data, and
wherein setting of a parity bit of the first data in the first communication mode and setting of a parity bit of the first data in the second communication mode are different.

23. An image-capturing apparatus according to claim 1, wherein the camera controller is configured to transmit, in the first and second communication modes, a request to the accessory apparatus to transmit the first data whose setting of a parity bit is predetermined so as to be different depending not on the first data, but on a communication mode of the accessory apparatus among the first and second communication modes.

24. An accessory apparatus according to claim 11, wherein the accessory controller is configured to transmit, in the first and second communication modes, to the image capturing apparatus, the first data whose setting of a parity bit is predetermined so as to be different depending not on the first data, but on the communication mode of the accessory controller.

25. An image capturing apparatus according to claim 1, wherein, in the second communication mode, the camera controller continues the reception of the first data during the maintenance of the third communication channel at the second signal level.

26. An image capturing apparatus according to claim 1, wherein, in the second communication mode, the camera controller stops the reception of the first data in accordance with a change of signal level of the third communication channel from the second level to the first level, after the maintenance of the third communication channel at the second signal level.

27. An image capturing apparatus according to claim 1, wherein, in the setting of the parity bit in the first communication mode, the parity bit indicates even parity or odd parity, and
wherein in the setting of the parity bit in the second communication mode, the parity bit is not included.

28. An image capturing apparatus according to claim 1, wherein the parity bit follows the first data, the first data consisting of a start bit of a third signal level and following 8 bit data.

29. An image capturing apparatus according to claim 28, wherein a signal level of the first communication channel after the parity bit is a fourth signal level which is a different signal level than the third signal level.

30. An image capturing apparatus according to claim 29, wherein, in the first communication mode, a stop bit of the fourth signal level follows the parity bit, and
wherein, in the second communication mode, a stop bit of the fourth signal level follows the 8 bit data.

31. An accessory apparatus according to claim 11, wherein, in the second communication mode, the accessory controller continues the transmission of the first data during the maintenance of the third communication channel at the second signal level.

32. An accessory apparatus according to claim 11, wherein, in the second communication mode, the accessory controller stops the transmission of the first data in accordance with a change of signal level of the third communication channel from the second level to the first level, after the maintenance of the third communication channel at the second signal level.

33. An accessory apparatus according to claim 11, wherein in the setting of the parity bit in the first communication mode, the parity bit indicates even parity or odd parity, and
wherein in the setting of the parity bit in the second communication mode, the parity is not included.

34. An accessory apparatus according to claim 11, wherein the parity bit follows the first data, the first data consisting of a start bit of a third signal level and following 8 bit data.

35. An accessory apparatus according to claim 34, wherein a signal level of the first communication channel after the parity bit is a fourth signal level which is a different signal level than the third signal level.

36. An accessory apparatus according to claim 35, wherein, in the first communication mode, a stop bit of the fourth signal level follows the parity bit, and
wherein, in the second communication mode, a stop bit of the fourth signal level follows the 8 bit data.

37. An accessory apparatus according to claim 11, wherein, in the second communication mode, the accessory controller receives the second data in accordance with the transmission of the first data.

38. An accessory apparatus according to claim 11, wherein the accessory controller is configured to:
in the first communication mode, not receive a communication request until a communication standby request is terminated; and
in the second communication mode, continue receiving the communication request from the image-capturing apparatus in accordance with the maintenance of the third communication channel at the second signal level until the communication of a predetermined amount is performed.

39. An accessory apparatus according to claim 11, wherein in the first communication where the accessory controller receives the second data in accordance with the transmission of the first data, the accessory controller receives the second data which is transmitted by the image-capturing apparatus in response to reception by the image-capturing apparatus of the first data that was transmitted by the accessory controller.

* * * * *